United States Patent
Li et al.

(10) Patent No.: US 12,096,460 B2
(45) Date of Patent: Sep. 17, 2024

(54) COMMUNICATION METHOD AND COMMUNICATIONS APPARATUS

(71) Applicant: Huawei Technologies Co., Ltd., Shenzhen (CN)

(72) Inventors: Bingzhao Li, Beijing (CN); Zhenzhen Cao, Beijing (CN); Lei Chen, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 713 days.

(21) Appl. No.: 17/171,702

(22) Filed: Feb. 9, 2021

(65) Prior Publication Data

US 2021/0168789 A1 Jun. 3, 2021

Related U.S. Application Data

(63) Continuation of application No. PCT/CN2019/098665, filed on Jul. 31, 2019.

(30) Foreign Application Priority Data

Aug. 9, 2018 (CN) .......................... 201810902756.3

(51) Int. Cl.
*H04W 72/04* (2023.01)
*H04L 5/00* (2006.01)
(Continued)

(52) U.S. Cl.
CPC ............ *H04W 72/51* (2023.01); *H04L 5/0094* (2013.01); *H04W 72/0453* (2013.01); *H04W 72/23* (2023.01)

(58) Field of Classification Search
None
See application file for complete search history.

(56) References Cited

U.S. PATENT DOCUMENTS 11,743,764 B2 * 8/2023 Lee .................. H04W 74/0808
11,843,563 B2 * 12/2023 Loehr .................. H04W 72/23
(Continued)

FOREIGN PATENT DOCUMENTS

| CN | 107071838 A | 8/2017 |
| WO | 2018121621 A1 | 7/2018 |
| WO | 2019159000 A1 | 8/2019 |

OTHER PUBLICATIONS

Samsung, "On Bandwidth Part Operation," 3GPP TSG RAN WG1 NR Ad-Hoc#3, Nagoya, Japan, R1-1716019, total 5 pages, 3rd Generation Partnership Project, Valbonne, France (Sep. 18-21, 2017).
(Continued)

*Primary Examiner* — Steve R Young
(74) *Attorney, Agent, or Firm* — Leydig, Voit & Mayer, Ltd.

(57) ABSTRACT

A communication method and an apparatus are provided. The method includes: receiving, by a terminal device, a first command sent by a network device, wherein the first command carries a first identifier, and is used to activate a first bandwidth part (BWP) indicated by the first identifier, and the first BWP is a BWP on a first component carrier (CC); and ignoring the first command when the terminal device does not support the first BWP and a second BWP being in an active state at the same time, wherein the second BWP is a BWP in the active state on a second CC, and the second CC is different from the first CC. According to the application, the terminal device may determine, based on a capability of the terminal device, to ignore an improper command, to optimize a problem of switching an active BWP in a carrier aggregation scenario.

20 Claims, 17 Drawing Sheets

(51) Int. Cl.
*H04W 72/0453* (2023.01)
*H04W 72/23* (2023.01)
*H04W 72/51* (2023.01)

(56) References Cited

U.S. PATENT DOCUMENTS

| | | | |
|---|---|---|---|
| 2018/0069589 A1 | 3/2018 | Liu et al. | |
| 2019/0253230 A1* | 8/2019 | Loehr | H04W 72/0453 |
| 2019/0357238 A1* | 11/2019 | Zhou | H04W 72/23 |
| 2019/0364602 A1* | 11/2019 | Yi | H04W 72/20 |
| 2020/0077432 A1* | 3/2020 | Xiong | H04L 1/1861 |

OTHER PUBLICATIONS

Samsung, "Remaining aspects to support bandwidth part," 3GPP TSG-RAN WG2 NR #100 Meeting, Reno, USA, R2-1713865, total 6 pages, 3rd Generation Partnership Project, Valbonne, France (Nov. 27-Dec. 1, 2017).

Intel Corporation, "Open issues for wider bandwidth operations," 3GPP TSG RAN WG1 NR Ad-Hoc#2 R1-1710583, Qingdao, P.R. China, total 7 pages, 3rd Generation Partnership Project, Valbonne, France (Jun. 27-30, 2017).

Qualcomm Incorporated, "Remaining control plane issues of BWP," 3GPP TSG-RAN WG2 Meeting #100 R2-1713885, Reno, USA, total 7 pages, 3rd Generation Partnership Project, Valbonne, France (Nov. 27-Dec. 1, 2017).

* cited by examiner

COMMUNICATION METHOD AND COMMUNICATIONS APPARATUS

CROSS-REFERENCE TO RELATED APPLICATIONS

This application is a continuation of International Application No. PCT/CN2019/098665, filed on Jul. 31, 2019, which claims priority to Chinese Patent Application No. 201810902756.3, filed on Aug. 9, 2018. The disclosures of the aforementioned applications are hereby incorporated by reference in their entireties.

TECHNICAL FIELD

Embodiments of this application relate to the field of communications technologies, and in particular, to a communication method and a communications apparatus.

BACKGROUND

In a 5th generation (5G) new radio (NR) system, a carrier bandwidth may reach 400 megahertz (MHz). However, a bandwidth supported by a bandwidth capacity supported by a terminal device is usually less than the carrier bandwidth. The bandwidth capability of the terminal device may be a maximum bandwidth that can be supported by the terminal device, for example, may be 20 MHz or 50 MHz. To adapt the bandwidth capability of the terminal device, a plurality of bandwidth parts (BWP) may be configured on one carrier, and each BWP may include a segment of contiguous resources in frequency domain. In a single-carrier scenario, a network device may activate one BWP on one carrier for the terminal device at a same moment, and may switch the active BWP on the carrier by using downlink control information (DCI) or radio resource control (RRC) signaling.

However, in a carrier aggregation scenario, the foregoing BWP switching mechanism is not compatible.

SUMMARY

Embodiments of this application provide a communication method and a communications apparatus, to optimize a problem of switching an active BWP in a carrier aggregation scenario.

According to a first aspect, a communication method is provided. The communication method includes: A terminal device receives a first command sent by a network device, where the first command carries a first identifier, the first command is used to activate a first BWP indicated by the first identifier, and the first BWP is a BWP on a first component carrier (CC); and the terminal device ignores the first command when the terminal device does not support the first BWP and a second BWP in being in an active state at the same time, where the second BWP is a BWP in the active state on a second CC, and the second CC is different from the first CC.

According to the foregoing method, after receiving the first command, the terminal device does not immediately execute the first command, but further determines whether the terminal device supports the first BWP and the second BWP in being in the active state at the same time. If the terminal device does not support the first BWP and the second BWP in being in the active state at the same time, the terminal device ignores the first command. However, if the terminal device still uses a BWP switching mechanism in a single-carrier scenario, the terminal device immediately executes the first command after receiving the first command. Because the terminal device does not support the first BWP and the second BWP in being in the active state at the same time, an error may occur when the terminal device executes the first command; or after executing the first command, the terminal device cannot correctly transmit data in the first BWP and the second BWP. According to the foregoing method, the terminal device may determine, based on a capability of the terminal device, to ignore an improper command, to optimize a problem of switching an active BWP in a carrier aggregation scenario.

In a possible design, there may be a plurality of first commands, and each first command may correspond to one first CC. In this design, that the terminal device does not support the first BWP and a second BWP in being in an active state at the same time may include: The terminal device does not support a plurality of first BWPs and a plurality of second BWPs in being in the active state at the same time, where the plurality of first BWPs are first BWPs that are indicated by the first identifier and that are respectively carried in the plurality of first commands; and that the terminal device ignores the first command may include: the terminal device ignores the plurality of first BWPs. In other words, if the terminal device receives the plurality of first commands, when the terminal device does not support the plurality of first BWPs and the plurality of second BWPs in being in the active state at the same time, the terminal device ignores all the received first commands. Further, there may be a plurality of second BWPs and a plurality of second CCs. Based on this, that the terminal device does not support the first BWP and a second BWP in being in an active state at the same time may include: The terminal device does not support the plurality of first BWPs and the plurality of second BWPs in being in the active state at the same time.

That the first command corresponds to the first CC may be understood as the first command sent for the first CC. That the second CC is different from the first CC may be understood as that the second CC is a type of CC on which the terminal device does not receive a corresponding first command.

In a possible design, the first command carries a second identifier, and the second identifier is used to identify the first CC. In this way, after receiving the first command, the terminal device may determine, based on the second identifier carried in the first command, that the first command is sent for the first CC. Certainly, if the first command does not carry the second identifier, the terminal device may alternatively determine, according to a rule agreed with the network device, that the first command corresponds to the first CC. For example, the terminal device may agree with the network device that if the first command is sent on the first CC, the terminal device may determine that the first command corresponds to the first CC.

In a possible design, the first command may include a BWP activation command, a BWP switching command, or a secondary cell activation command.

In a possible design, after ignoring the first command, the terminal device may further send a first indication to the network device, where the first indication is used to indicate that the first command does not take effect, or send a negative acknowledgement NACK message for the first command to the network device. The first indication may carry the first identifier.

According to a second aspect, a communication method is provided. The communication method includes: A terminal device receives a first command sent by a network device, where the first command carries a first identifier, the first command is used to activate a first BWP indicated by the first identifier, and the first BWP is a BWP on a first CC; and the terminal device activates the first BWPs and a third BWP, where there is an association relationship between the first BWP and the third BWP, and the third BWP is a BWP on a second CC.

According to the foregoing method, the terminal device may switch BWPs on a plurality of CCs at the same time by using the association relationship. However, a BWP switching mechanism in an existing single-carrier scenario is used for a case in which a BWP on only one CC can be switched for one first command. If this method is still used in a carrier aggregation scenario, the BWP on only one CC can be switched at a time. If the BWPs on the plurality of CCs need to be switched at the same time, a plurality of first commands need to be sent. Because the plurality of commands may be lost during transmission, the terminal device may receive only a part of commands, and the BWPs on the plurality of CCs cannot be switched at the same time, resulting in a switching error, a data transmission error after switching, or the like. However, according to the method in this application, the terminal device can switch the BWPs on the plurality of CCs at the same time by using one first command. This is convenient and error-proofing, and can resolve a problem of switching an active BWP in a carrier aggregation scenario.

Optionally, the third BWP may be a BWP in an inactive state on the second CC.

In a possible design, that there is an association relationship between the first BWP and the third BWP may include: The terminal device supports the first BWP and the third BWP in being in an active state at the same time.

In a possible design, there are a plurality of third BWPs on a same second CC. This may be understood as that there are a plurality of third BWPs that are on the second CC and that have association relationships with first BWPs. In this design, the network device may send an association relationship identifier to the terminal device, and before activating the first BWP and the third BWP, the terminal device may further receive the association relationship identifier sent by the network device. The association relationship identifier indicates an association relationship between the first BWP and a specific third BWP, and the specific third BWP is a BWP included in the plurality of third BWPs. That the terminal device activates the first BWP and a third BWP may include: The terminal device activates the first BWP and the specific third BWP. In other words, when there are the plurality of third BWPs that are on the second CC and that have the association relationships with the first BWPs, the network device may indicate the terminal device to activate one of the plurality of third BWPs.

In a possible design, the first command carries a second identifier, and the second identifier is used to identify the first CC. In this way, after receiving the first command, the terminal device may determine, based on the second identifier carried in the first command, that the first command corresponds to the first CC. Certainly, if the first command does not carry the second identifier, the terminal device may alternatively determine, according to a rule agreed with the network device, that the first command corresponds to the first CC. For example, the terminal device may agree with the network device that if the first command is sent on the first CC, the terminal device may determine that the first command corresponds to the first CC.

In a possible design, the network device may configure the association relationship for the terminal device. In this design, before activating the first BWP and the third BWP, the terminal device may further receive the association relationship sent by the network device.

In a possible design, before sending the association relationship to the terminal device, the network device may further determine the association relationship. For example, the network device may determine the association relationship based on parameters of a plurality of BWPs configured for the terminal device.

In a possible design, the association relationship is pre-stored by the terminal device.

In a possible design, the first command may include a BWP activation command, a BWP switching command, or a secondary cell activation command.

According to a third aspect, a terminal device is provided. The terminal device includes a transceiver module and a processing module. Based on the communication method in the first aspect, the transceiver module may be configured to receive a first command sent by a network device, where the first command carries a first identifier, the first command is used to activate a first BWP indicated by the first identifier, and the first BWP is a BWP on a first CC; and the processing module may be configured to ignore the first command when determining that the processing module does not support the first BWP and a second BWP in being in an active state at the same time, where the second BWP is a BWP in the active state on a second CC, and the second CC is different from the first CC.

In a possible design, there may be a plurality of first commands, and each first command corresponds to one first CC. In this design, that the processing module is configured to determine that the processing module does not support the first BWP and a second BWP in being in an active state at the same time includes: The processing module is configured to determine that the processing module does not support a plurality of first BWPs and a plurality of second BWPs in being in the active state at the same time, where the plurality of first BWPs are first BWPs that are indicated by the first identifier and that are respectively carried in the plurality of first commands; and that the processing module is configured to ignore the first command includes: the processing module is configured to ignore the plurality of first BWPs.

In a possible design, there are a plurality of second BWPs and a plurality of second CCs. In this design, that the processing module is configured to determine that the processing module does not support the first BWP and a second BWP in being in an active state at the same time includes: The processing module is configured to determine that the processing module does not support the plurality of first BWPs and the plurality of second BWPs in being in the active state at the same time.

In a possible design, the first command may include a BWP activation command, a BWP switching command, or a secondary cell activation command.

In a possible design, the transceiver module is further configured to send a first indication to the network device, where the first indication is used to indicate that the first command does not take effect; or the transceiver module is further configured to send a negative acknowledgement NACK message for the first command to the network device.

In a possible design, the first indication carries the first identifier.

In a possible design, the first command carries a second identifier, and the second identifier is used to identify the first CC.

Based on the communication method in the second aspect, the transceiver module in the terminal device provided in this embodiment of this application may be further configured to receive a first command sent by a network device, where the first command carries a first identifier, the first command is used to activate a first BWP indicated by the first identifier, and the first BWP is a BWP on a first CC; and the processing module may be further configured to activate the first BWP and a third BWP, where there is an association relationship between the first BWP and the third BWP, the third BWP is a BWP on a second CC, and the second CC is different from the first CC.

In a possible design, that there is an association relationship between the first BWP and the third BWP includes: The processing module supports the first BWP and the third BWP in being in the active state at the same time.

In a possible design, there are a plurality of third BWPs on a same second CC. In this design, the processing module is further configured to: before activating the first BWP and the third BWP, receive, through the transceiver module, an association relationship identifier sent by the network device, where the association relationship identifier indicates an association relationship between the first BWP and a specific third BWP, and the specific third BWP is a BWP included in the plurality of third BWPs; and that the processing module is configured to activate the first BWP and a third BWP includes: the processing module is configured to activate the first BWP and the specific third BWP.

In a possible design, the processing module is further configured to: before activating the first BWP and the third BWP, receive, through the transceiver module, the association relationship sent by the network device.

In a possible design, the association relationship is prestored by the terminal device.

In a possible design, the first command may include a BWP activation command, a BWP switching command, or a secondary cell activation command.

In a possible design, the first command carries a second identifier, and the second identifier is used to identify the first CC.

According to a fourth aspect, a network device is provided. The network device includes a transceiver module and a processing module. Based on the communication method in the first aspect, the transceiver module may be configured to send a first command to a terminal device, where the first command carries a first identifier, the first command is used to activate a first BWP indicated by the first identifier, and the first BWP is a BWP on a first CC; and the transceiver module is configured to: receive a first indication sent by the terminal device, where the first indication is used to indicate that the first command does not take effect, or receive a negative acknowledgement NACK message sent by the terminal device for the first command.

In a possible design, there may be a plurality of first commands, and each first command corresponds to one first CC.

In a possible design, the first command may include a BWP activation command, a BWP switching command, or a secondary cell activation command.

In a possible design, the first indication carries the first identifier.

In a possible design, the first command carries a second identifier, and the second identifier is used to identify the first CC.

Based on the communication method in the second aspect, the transceiver module in the network device provided in this embodiment of this application may be further configured to send a first command to a terminal device, where the first command carries a first identifier, the first command is used to activate a first BWP indicated by the first identifier, and the first BWP is a BWP on a first CC; the processing module may be configured to determine an association relationship, where the association relationship is an association relationship between the first BWP and a third BWP, and the third BWP is a BWP on a second CC; and the transceiver module may be further configured to send the association relationship to the terminal device.

In a possible design, that there is an association relationship between the first BWP and the third BWP includes: The processing module supports the first BWP and the third BWP in being in the active state at the same time.

In a possible design, there are a plurality of third BWPs on a same second CC. In this design, the processing module is further configured to: send an association relationship identifier to the terminal device through the transceiver module, where the association relationship identifier indicates an association relationship between the first BWP and a specific third BWP, and the specific third BWP is a BWP included in the plurality of third BWPs.

In a possible design, the processing module is specifically configured to determine the association relationship based on parameters of a plurality of BWPs configured for the terminal device.

In a possible design, the first command may include a BWP activation command, a BWP switching command, or a secondary cell activation command.

In a possible design, the first command carries a second identifier, and the second identifier is used to identify the first CC.

According to a fifth aspect, a terminal device is provided. The terminal device includes a memory and a processor, the memory is configured to store an instruction, the processor is configured to execute the instruction stored in the memory, and execution of the instruction stored in the memory enables the processor to perform the method for the terminal device according to any one of the first aspect, the possible designs of the first aspect, the second aspect, or the possible design of the second aspect.

According to a sixth aspect, a network device is provided. The network device includes a memory and a processor, the memory is configured to store an instruction, the processor is configured to execute the instruction stored in the memory, and execution of the instruction stored in the memory enables the processor to perform the method for the network device according to any one of the first aspect, the possible designs of the first aspect, the second aspect, or the possible design of the second aspect.

According to a seventh aspect, a computer-readable storage medium is provided. The computer-readable storage medium stores a computer program; and when the program is executed by a processor, the method according to any one of the first aspect and the possible implementations of the first aspect, or the second aspect and the possible designs of the second aspect is implemented.

According to an eighth aspect, a computer program product is provided. When the computer program product is run by a computer, the computer can be enabled to implement the method according to any one of the first aspect and the possible designs of the first aspect, or the second aspect and the possible designs of the second aspect.

According to a ninth aspect, a chip is provided. The chip is coupled to a transceiver, and is configured to implement the method according to any one of the first aspect and the possible designs of the first aspect, or the second aspect and the possible designs of the second aspect.

DESCRIPTION OF EMBODIMENTS

Figure 1A:
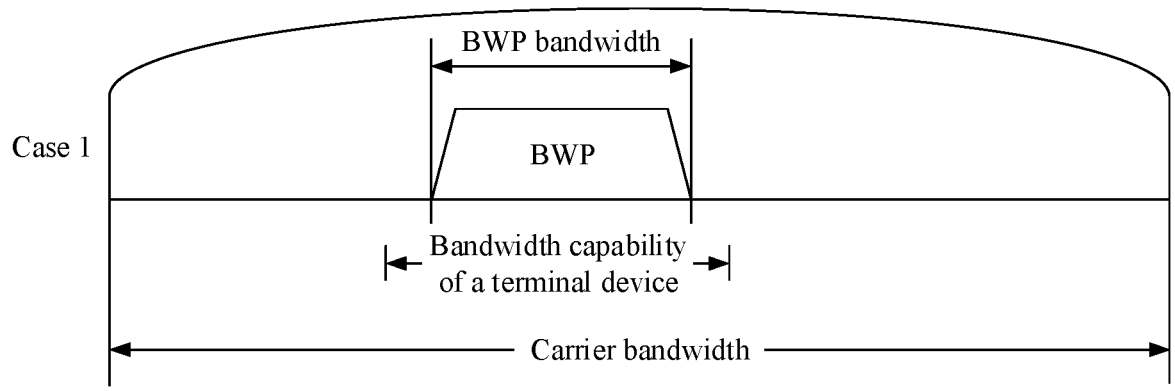
FIG. 1a to FIG. 1c are schematic diagrams of configurations of BWPs in carrier bandwidths according to embodiments of this application.

The following describes technical solutions in this application with reference to accompanying drawings in this specification.

It should be understood that the technical solutions in embodiments of this application may be used in a 5G communications system, a future 5G communications system, or the like. This is not limited in the embodiments of this application.

A terminal device in the embodiments of this application may be a device that provides voice and/or data connectivity for a user, and is also referred to as user equipment (UE), a mobile station (MS), a mobile terminal (MT), or the like, for example, a handheld device or a vehicle-mounted device that has a wireless connection function. Currently, some examples of the terminal device are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

A network device in the embodiments of this application may be a device in a wireless network, for example, a radio access network (RAN) node (or device) that connects a terminal device to the wireless network, and may also be referred to as a base station. Currently, some examples of the RAN nodes are: a next generation NodeB (gNB), a transmission reception point (TRP), an evolved NodeB (eNB), a radio network controller (RNC), a NodeB (NB), a base station controller (BSC), a base transceiver station (BTS), a home evolved NodeB (for example, a home NodeB, or HNB), a baseband unit (BBU), a wireless fidelity (Wi-Fi) access point (AP), or the like. In addition, in a network structure, the RAN may include a centralized unit (CU) node and a distributed unit (DU) node. In this structure, protocol layers of an eNB in a long term evolution (LTE) system are split, where functions of some protocol layers are centrally controlled by the CU, functions of some or all of remaining protocol layers are distributed in the DU, and the CU centrally controls the DU.

A core network (CN) device is provided in the embodiments of this application. The CN device corresponds to different devices in different communications systems, for example, corresponds to a serving GPRS support node (SGSN) or a gateway GPRS support node (GGSN) in a 3G system, corresponds to a mobility management entity (MME) or a serving gateway (S-GW) in a 4G system, and in a 5G system, corresponds to a core network-related device (for example, an NG-Core) in the 5G system.

For ease of understanding this application, some terms in this application are first explained and described.

(1) A carrier bandwidth is a bandwidth supported by a carrier, and may also be referred to as a system bandwidth, a carrier, or the like. For example, a carrier bandwidth of an NR system may be one of 10 MHz, 15 MHz, 20 MHz, 50 MHz, 100 MHz, 400 MHz, or the like.

Figure 1B:
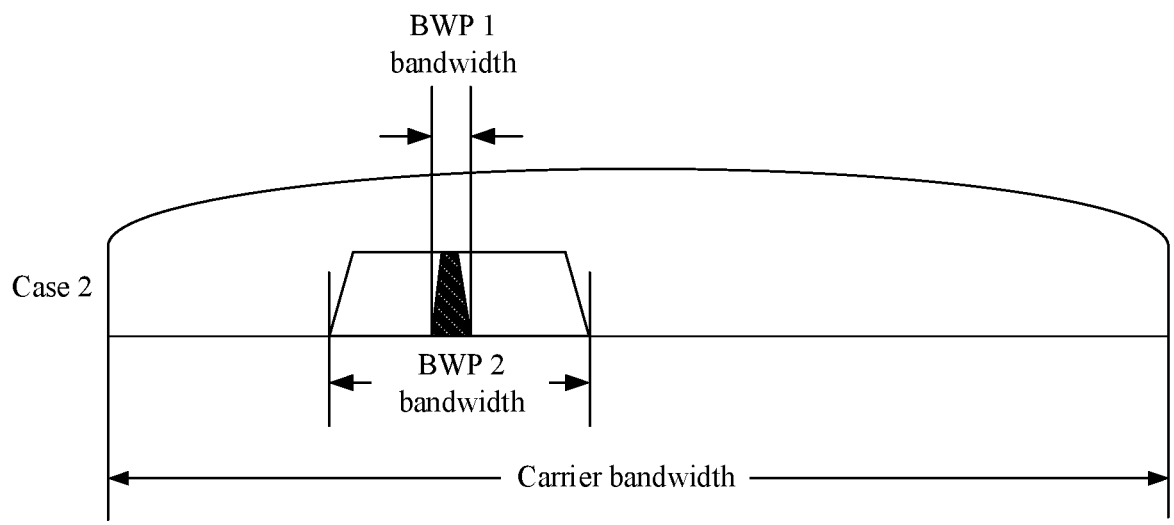
Figure 1C:
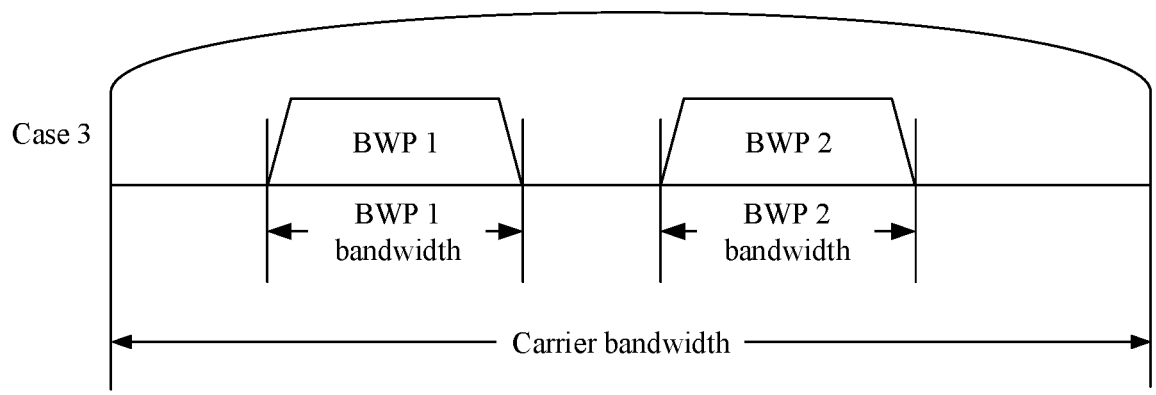

(2) A BWP is a segment of contiguous resources (for example, a group of contiguous RBs in a carrier bandwidth) configured for a terminal device in the carrier bandwidth in an NR system to adapt to a bandwidth capability of the terminal device. A plurality of BWPs may be configured on one carrier. For example, four BWPs may be configured on one carrier. A network device may configure several BWPs for the terminal device. However, only one BWP is in an active state at any moment, and the BWP in the active state is a currently available BWP. In addition, sometimes, the bandwidth part may also be referred to as a carrier bandwidth part, a subband bandwidth, a narrowband bandwidth, or another name. The name is not limited in this application. For ease of description, an example in which the name is the BWP is used for description. For example, one BWP includes K (K>0) contiguous subcarriers. Alternatively, one BWP is a frequency domain resource on which N non-overlapping contiguous RBs are located, and a subcarrier spacing (SCS) of the RB may be 15 kHz, 30 kHz, 60 kHz, 120 kHz, 240 kHz, 480 kHz, or another value. Alternatively, one BWP is a frequency domain resource on which M non-overlapping contiguous resource block groups (RBG) are located, one RBG includes P (P>0) contiguous RBs, and a subcarrier spacing ( ) of the RB may be 15 kHz, 30 kHz, 60 kHz, 120 kHz, 240 kHz, 480 kHz or another value, for example, an integer multiple of 2. FIG. 1a to FIG. 1c show three types of configurations of BWPs in carrier bandwidths according to embodiments of this application. FIG. 1a shows a case in which one BWP is configured in a carrier bandwidth. A network device may first allocate the BWP within a bandwidth capability range of a terminal device to the terminal device, and certainly may further allocate some or all of resources in the BWP to the terminal device for data transmission. The network device may configure different BWPs for the terminal device based on an actual scenario. For example, to reduce power consumption of the terminal device, the network device may allocate the BWP to the terminal device based on a service volume of the terminal device. When the terminal device transmits no service data or transmits only a small amount of service data, a relatively small BWP, for example, a BWP 1 shown in FIG. 1b, may be allocated to the terminal device to receive control information and a small amount of data information. When the terminal device needs to transmit a large amount of service data, a relatively large bandwidth part, for example, a BWP 2 shown in FIG. 1b, may be allocated to the terminal device. For another example, in 5G, a plurality of service types and communication scenarios may be supported, and different parameters may be configured for different service types and communication scenarios. The network device may allocate corresponding BWPs to the terminal device based on different service types of the terminal device. As shown in FIG. 1c, one BWP may correspond to one service type, and to meet a service requirement of the service type, the BWP may be configured with a numerology that can meet the service requirement. It can be learned from FIG. 1b that different BWPs may occupy frequency domain resources that partially overlap. It can be learned from FIG. 1c that different BWPs may alternatively occupy completely different frequency domain resources and use different numerologies. In the embodiments of this application, numerologies corresponding to different BWPs may be the same or may be different. This is not limited in this application. It may be understood that in FIG. 1a to FIG. 1c, an example in which only one or two BWPs are configured on one carrier is used for description. In an actual application, a plurality of BWPs may be configured on the carrier. This is not limited in this application.

(3) A numerology is a parameter used in a communications system, for example, may be a series of physical layer parameters in an air interface. During specific implementation, one BWP may correspond to one numerology. An NR system may support a plurality of numerologies, and the plurality of numerologies can be used interchangeably. The numerology may include one or more of the following parameter information: a subcarrier spacing, information about a cyclic prefix (CP), information about a time unit, a bandwidth, or the like. The information about the CP may include a length of the CP and/or a CP type. For example, the CP may be a normal CP (NCP) or an extended CP (ECP). The time unit is used to indicate a time unit in time domain, and may be, for example, a sampling point, a symbol, a mini-slot, a slot, a subframe, or a radio frame. The information about the time unit may include a type, a length, a structure, or the like of the time unit. For example, the numerology may include the subcarrier spacing and the CP. Referring to Table 1, Table 1 provides a numerology that can be currently supported in the NR system and that is defined by the subcarrier spacing and the CP.

TABLE 1

| μ | Subcarrier spacing = $2^\mu \cdot 15$ (kHz) | CP type |
| --- | --- | --- |
| 0 | 15 | Normal (normal) |
| 1 | 30 | Normal |
| 2 | 60 | Normal or extended (extended) |
| 3 | 120 | Normal |
| 4 | 240 | Normal |

μ is used to determine the subcarrier spacing. For example, when μ=0, the subcarrier spacing is 15 kHz; or when μ=1, the subcarrier spacing is 30 kHz.

The subcarrier spacing is used as an example. If the terminal device supports the subcarrier spacing of 15 kHz and the subcarrier spacing of 30 kHz, the network device may allocate a BWP with the subcarrier spacing of 15 kHz and a BWP with the subcarrier spacing of 30 kHz to the terminal device. The terminal device may switch to different BWPs for signal transmission based on different scenarios and service requirements. When the terminal device supports a plurality of BWPs, numerologies corresponding to different BWPs may be the same or may be different.

The subcarrier spacing may be an integer greater than or equal to 0. For example, the subcarrier spacing may be 15 kHz, 30 kHz, 60 kHz, 120 kHz, 240 kHz, 480 kHz, or the like. For example, different subcarrier spacings may be integer multiples of 2. It may be understood that the subcarrier spacing may alternatively be designed to be another value. The subcarrier spacing is a value of a spacing between central positions or peak positions of two adjacent subcarriers in frequency domain in an orthogonal frequency division multiplexing (OFDM) system. For example, a subcarrier spacing in an LTE system is 15 kHz (kilohertz), and a subcarrier spacing in an NR system may be 15 kHz, 30 kHz, 60 kHz, 120 kHz, or the like.

(4) Carrier aggregation (CA) supports aggregation of a plurality of (for example, two to five) CCs, to implement a relatively high transmission bandwidth, so that uplink and downlink transmission rates can be efficiently improved. The terminal device may determine, based on a capability of the terminal device, a maximum quantity of CCs that can be used at the same time for uplink and downlink transmission. When the terminal device works in a carrier aggregation scenario, a plurality of CCs are configured, and several BWPs may be configured on each CC. Activation and deactivation of BWPs between CCs may be completely independent.

(5) Activating a BWP means switching the BWP from an inactive state to an active state, or may be understood as switching an unworkable BWP to a workable BWP. Correspondingly, "deactivating" the BWP may also be described as performing deactivation on the BWP, that is, switching the BWP from the active state to the inactive state, or may also be understood as switching a workable BWP to an unworkable BWP.

(6) An active state may be a workable state. That the BWP is in the active state means that the BWP is in the workable state, for example, a state in which a signal can be sent or received. An inactive state is a concept corresponding to the active state, and may be an unworkable state. That the BWP is in the inactive state means that the BWP is in the unworkable state. For example, signal can't be received/transmitted for an inactive BWP.

(7) An active BWP is a BWP in an active state, or may be understood as that a signal can be sent or received for the BWP. An inactive BWP is a concept corresponding to the active BWP, and is a BWP in an inactive state, or may be understood as that a signal cannot be sent or received for the BWP.

(8) BWP switching, used to switch an active BWP. The terminal device may switch the active BWP by receiving a BWP switching command sent by the network device, that is, activate a new BWP and deactivate an old BWP. In the switching method, an identifier of a target active BWP is carried in the BWP switching command, so that the terminal device performs the BWP switching. When the terminal device performs the BWP switching, the terminal device deactivates an original workable BWP, and activates a to-be-switched target BWP. For example, the BWP switching command may be RRC signaling or DCI. If the BWP switching command is the RRC signaling, one switching command may be used by the terminal device to activate a plurality of BWPs. In a carrier aggregation scenario, the switching command may be used by the terminal device to activate a plurality of BWPs on a plurality of carriers. However, because a delay of the RRC signaling is relatively long and a timing is not precise enough, the BWP switching performed by using the RRC signaling is used in rare scenarios, for example, an initial BWP configuration scenario. If the BWP switching command is the DCI, because one piece of the DCI can include a BWP on only one carrier, one switching command can be used by the terminal device to activate only one BWP. In the carrier aggregation scenario, if active BWPs on a plurality of CCs need to be switched at the same time, the DCI needs to be sent for each CC.

(9) An initial BWP is used for initial random access of the terminal device, and may include an initial downlink BWP and an initial uplink BWP. It may be understood that in an initial random access process of the terminal device, the terminal device may transmit a signal to the network device or perform a related operation by using the initial BWP.

(10) A cell is described from a perspective of resource management, mobility management, or a service unit by a higher layer (for example, a protocol layer above a physical layer such as an RRC layer or a medium access control (MAC) layer). Coverage of each network device may be divided into one or more cells. One cell may be considered as a cell including specific frequency domain resources, that is, one cell may include a carrier. Therefore, one BWP may also be understood as a part of a bandwidth of one cell. A cell is a common name. For the terminal device, a cell that provides a service for the terminal device is referred to as a serving cell. The cell in this application may also be a serving cell.

(11) Carrying may mean that a message (for example, a command) is used to carry information or data, or may mean that a message includes information.

(12) In descriptions of this application, unless otherwise specified, "a plurality of" means two or more, and another quantifier is similar to this. The term "and/or" describes an association relationship between associated objects and represents that three relationships may exist. For example, A and/or B may represent the following three cases: Only A exists, both A and B exist, and only B exists. The character "/" usually indicates an "or" relationship between the associated objects.

(13) The nouns "network" and "system" are usually interchangeably used, but meanings of the nouns can be understood by a person skilled in the art. The terms "information", "signal", "message", and "channel" may be interchangeably used sometimes. It should be noted that meanings expressed by the terms are consistent when differences of the terms are not emphasized.

It should be understood that, in the descriptions of this application, the terms such as "first" and "second" are merely used for differentiation and description, but cannot be understood as indicating or implying relative importance, and cannot be understood as indicating or implying a sequence.

Figure 2:
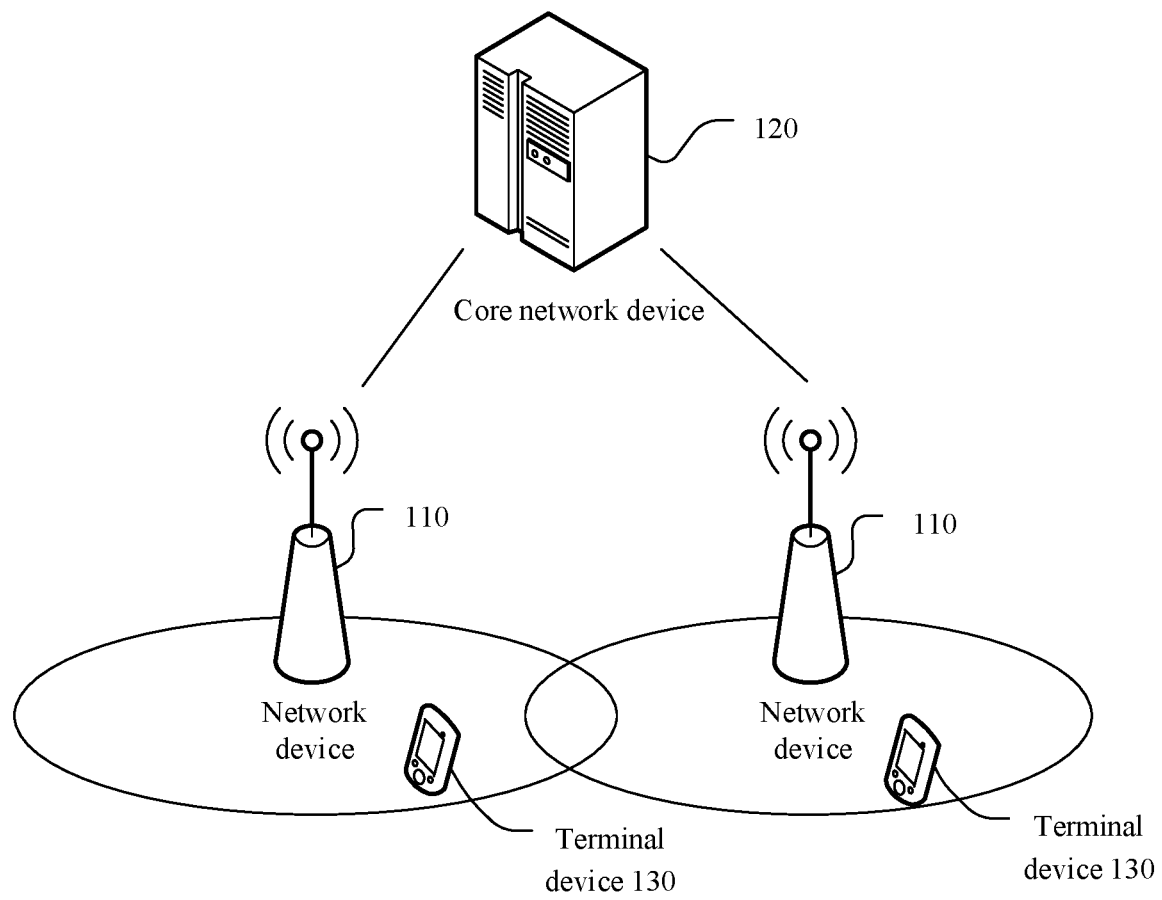
FIG. 2 is a schematic architectural diagram of a wireless communications system according to an embodiment of this application.

FIG. 2 is a schematic diagram of a communications system to which an embodiment of this application can be used. As shown in FIG. 2, a terminal device 130 accesses a wireless network, to obtain a service from an external network (for example, the internet) through the wireless network or communicate with another terminal through the wireless network. The wireless network includes a network device 110 and a core network device 120. The network device 110 is configured to connect the terminal device 130 to the wireless network, and the core network device 120 is configured to manage the terminal device and provide a gateway for communicating with the external network. It should be understood that an example in which a network architecture includes only two terminal devices 130 in FIG. 2 is used for description. However, the embodiments of this application are not limited thereto. For example, the network architecture may further include more terminal devices 130. Similarly, the network architecture may alternatively include more network devices 110, and may alternatively include another device.

It may be understood that the network architecture to which the solutions in the embodiments of this application are used may be a 5G NR network architecture, or certainly may be a network architecture newly added in the future. Corresponding names of the network device and the terminal device in the embodiments of this application may be names of corresponding functions in a wireless communications network. For example, in an NR system, the network device may be a gNB, a TRP, or the like, and the terminal device may be UE, an MS, or the like. In the embodiments of this application, the 5G NR network architecture is used as an example for description.

In the network architecture shown in FIG. 2, the network device (for example, the gNB) may configure carrier aggregation information for the terminal device (for example, the UE), to enable the terminal device to work in a carrier aggregation scenario, that is, the terminal device works on a plurality of CCs. Each piece of the carrier aggregation information is used to configure one CC, each piece of the carrier aggregation information may include a BWP set, the BWP set includes one or more pieces of BWP configuration information, the BWP configuration information may include a quantity of BWPs, a numerology related to the BWP, and the like, and the BWP configuration information is used to configure the BWP on the CC. In the carrier aggregation scenario, the network device may activate one BWP on each of a plurality of CCs for the terminal device at a same moment, the network device may independently send a BWP control command (for example, a BWP switching command or a BWP activation command) for each CC to the terminal device, and the terminal device may activate a new BWP on each CC based on the received BWP control command. However, in some scenarios (for example, a scenario in which network quality is poor), the terminal device may receive only a part of BWP control commands sent by the network device. In this case, if the terminal device executes the part of BWP control commands, an error may occur.

Based on the foregoing problem, an embodiment of this application provides a communication method, to optimize a problem of switching an active BWP in a carrier aggregation scenario.

Figure 3:
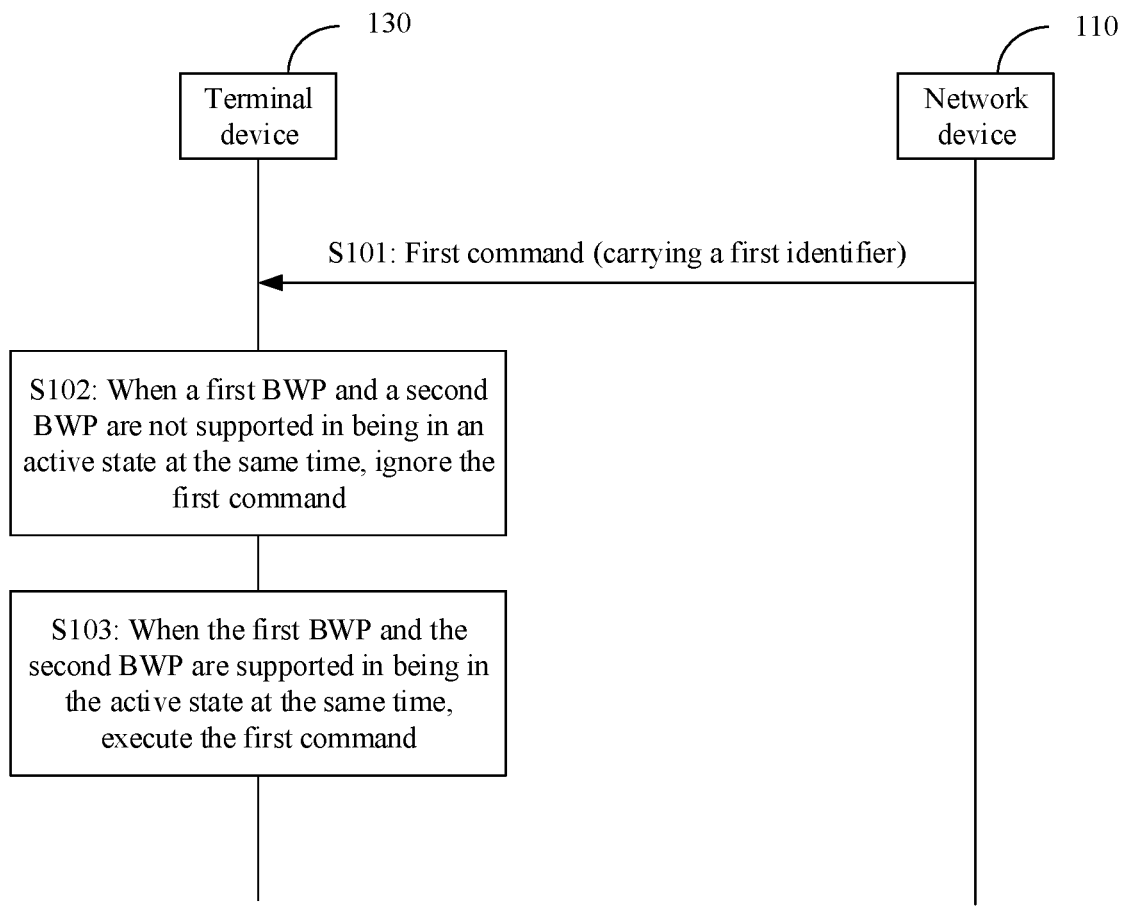
FIG. 3 is a schematic flowchart of a communication method according to an embodiment of this application.

The following uses the network device 110 and the terminal device 130 as an example to describe the communication method provided in this embodiment of this application. As shown in FIG. 3, the method includes the following steps.

S101: The terminal device 130 receives a first command sent by the network device 110. The first command carries a first identifier, the first command is used to activate a first BWP indicated by the first identifier, and the first BWP is a BWP on a first CC.

In this application, the first command may include a BWP activation command, a BWP switching command, or a secondary cell activation command. The BWP activation command is used only to activate a specific BWP. The BWP switching command is used to activate the specific BWP, and deactivate another active BWP on a carrier on which the specific BWP is located. The secondary cell activation command is used to activate a secondary cell and a specific BWP in the secondary cell. The specific BWP in this application is the first BWP.

In this application, the first identifier indicates an identifier that can uniquely identify the first BWP. For example, the identifier may be an identifier configured by the network device 110 for the first BWP.

In this application, after receiving the first command, the terminal device 130 may determine, based on a capability of the terminal device 130, whether the terminal device 130 supports the first BWP and a second BWP in being in an active state at the same time. If the terminal device 130 does not support the first BWP and the second BWP in being in the active state at the same time, S102 is performed. If the terminal device 130 supports the first BWP and the second BWP in being in the active state at the same time, S103 is performed.

S102: When the terminal device 130 does not support the first BWP and the second BWP in being in the active state at the same time, the terminal device 130 ignores the first command. The ignoring may also be understood as not executing, ignoring execution of, discarding, or the like.

In this application, the second BWP is a BWP in the active state on a second CC, and the second CC is different from the first CC. That the second CC is different from the first CC may mean that the second CC and the first CC are two types of CCs for the terminal device 130. In this application, the first CC refers to a type of CC on which the terminal device 130 receives the corresponding first command, and the second CC refers to a type of CC on which the terminal device 130 does not receive the corresponding first command.

Whether the terminal device 130 does not support the first BWP and the second BWP in being in the active state at the same time depends on the capability of the terminal device 130. For example, the capability of the terminal device 130 supports that only BWPs with a same parameter are in the active state at the same time. For example, the parameter may be an SCS and/or a CP.

According to the foregoing method, the terminal device may determine, based on the capability of the terminal device, to ignore an improper command, to optimize a problem of switching an active BWP in a carrier aggregation scenario.

S103: When the terminal device 130 supports the first BWP and the second BWP in being in the active state at the same time, the terminal device 130 executes the first command.

If the first command is the BWP activation command, the executing the first command may be understood as activating the first BWP.

If the first command is the BWP switching command, the executing the first command may be understood as activating the first BWP and deactivating a BWP that is in an active state on the first CC before the first BWP is activated.

If the first command is the secondary cell activation command, the executing the first command may be understood as activating a secondary cell of the cell in which the first CC is located, and activating the first BWP of the secondary cell. When the secondary cell activation command is used to activate the BWP in the secondary cell, the secondary cell activation command may not carry the first identifier used to indicate the to-be-activated BWP, and the terminal device 130 may determine, based on a first active BWP that is preconfigured, the BWP used when the secondary cell is activated. The first active BWP is a first used BWP that is preconfigured by the network device 110 for the terminal device 130 when the secondary cell is activated. Optionally, the network device 110 may configure a plurality of first active BWPs for the terminal device 130, and the terminal device 130 may select one of the plurality of first active BWPs based on active BWPs on other CCs. For example, if only one first active BWP can form an active BWP combination supported by the terminal device 130 with the active BWPs on other CCs, the terminal device 130 uses the first active BWP as the BWP used when the secondary cell is activated.

It may be understood that either S102 or S103 is performed.

In a possible implementation, the first command may further carry a second identifier, and the second identifier is used to identify the first CC. In this way, after receiving the first command, the terminal device 130 may determine, based on the second identifier carried in the first command, that the first command corresponds to the first CC, that is, the first command is a command sent for the first CC. In another possible implementation, if the first command does not carry the second identifier, the terminal device 130 may alternatively determine, according to a rule agreed with the network device 110, that the first command corresponds to the first CC. For example, the terminal device 130 may agree with the network device 110 that if the first command is sent on the first CC, the terminal device 130 may determine that the first command corresponds to the first CC.

In this application, there may be one or more first commands. There may be one or more second BWPs and second CCs.

In a possible implementation, when there are a plurality of first commands and there is one second BWP and one second CC, that the terminal device does not support the first BWP and the second BWP in being in the active state at the same time may include: The terminal device does not support a plurality of first BWPs and the second BWP in being in the active state at the same time, where the plurality of first BWPs are first BWPs that are indicated by the first identifier and that are respectively carried in the plurality of first commands; and that the terminal device ignores the first command may include: the terminal device ignores the plurality of first BWPs. In other words, if the terminal device receives the plurality of first commands, when the terminal device does not support the plurality of first BWPs and the second BWP in being in the active state at the same time, the terminal device ignores all the received first commands.

In a possible implementation, when there are a plurality of first commands and there are also a plurality of second BWPs and a plurality of second CCs, that the terminal device does not support the first BWP and the second BWPs in being in the active state at the same time may include: The terminal device does not support the plurality of first BWPs and the plurality of second BWPs in being in the active state at the same time.

The following describes the communication method provided in this embodiment of this application by using an example in which the network device 110 and the terminal device 130 are used, there is one first command, one second BWP, and one second CC, and the first command is a BWP switching command.

Figure 4:
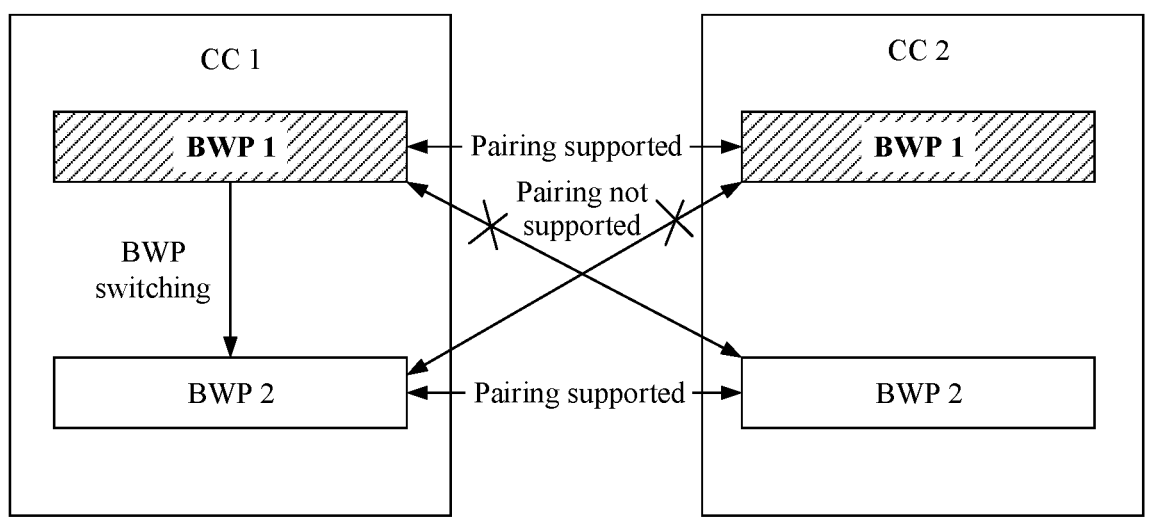
FIG. 4 is a schematic diagram of a configuration of a CC and a BWP according to an embodiment of this application.

Referring to FIG. 4, the network device 110 in FIG. 4 configures two CCs for the terminal device 130: a CC 1 and a CC 2. Each CC includes two BWPs: a BWP 1 and a BWP 2. It is assumed that bandwidths of the BWP 1 on the CC 1 and the BWP 1 on the CC 2 are both 5 MHz, bandwidths of the BWP 2 on the CC 1 and the BWP 2 on the CC 2 are both 100 MHz, and BWPs that are in an active state and that are on the CC 1 and the CC 2 are both the BWPs 1. In this example, it is further assumed that the capability of the terminal device 130 includes: supporting the BWP 1 on the CC 1 and the BWP 1 on the CC 2 in being in the active state at the same time. It may alternatively be understood as that the terminal device 130 supports the BWP 1 on the CC 1 and the BWP 1 on the CC 2 in working at the same time and supports the BWP 2 on the CC 1 and the BWP 2 on the CC 2 in being in the active state at the same time. It may alternatively be understood as that the terminal device 130 supports the BWP 2 on the CC 1 and the BWP 2 on the CC 2 in working at the same time, and the terminal device 130 does not support the BWP 1 on the CC 1 and the BWP 2 on the CC 2 in being in the active state at the same time. It may alternatively be understood as that the terminal device 130 does not support the BWP 1 on the CC 1 and the BWP 2 on the CC 2 in working at the same time, and does not support the BWP 2 on the CC 1 and the BWP 1 on the CC 2 in being in the active state at the same time. It may alternatively be understood as that the terminal device 130 does not support the BWP 2 on the CC 1 and the BWP 1 on the CC 2 in working at the same time. In other words, that the terminal device 130 can support a BWP combination or BWP pairing in the active state at the same time includes: the BWP 2 on the CC 1 and the BWP 2 on the CC 2, and the BWP 1 on the CC 1 and the BWP 1 on the CC 2. That the terminal device 130 does not support the BWP combination or the BWP pairing in being in an active state at the same time includes: the BWP 1 on the CC 1 and the BWP 2 on the CC 2, and the BWP 2 on the CC 1 and the BWP 1 on the CC 2. In FIG. 4, the terminal device 130 may currently transmit a signal by using the active BWP 1 on the CC 1 and the active BWP 1 on the CC 2. It may be understood as that the terminal device 130 may currently work on the BWP 1 with a narrower bandwidth. When the network device 110 expects the terminal device 130 to work on the BWP 2 with a wider bandwidth, the BWP 2 needs to be activated, a BWP switching command may be sent to the terminal device 130, and an identifier of the BWP 2 is carried in the BWP switching command, so that the terminal device 130 activates the BWP 2 based on the BWP switching command and deactivates the BWP 1. After completing BWP switching, the terminal device 130 may transmit the signal by using the active BWP 2.

It may be understood that, that two available CCs are configured for the terminal device 130 in FIG. 4 may be understood as that the terminal device 130 is in a carrier aggregation scenario. In this scenario, to ensure that the active BWP combination is a BWP combination supported by the terminal device 130, if the BWP 2 needs to be activated, the network device 110 may send a BWP switching command for the CC 1 and a BWP switching command for the CC 2 to the terminal device 130, so that the terminal device 130 may activate the BWP 2 on the CC 1 based on the BWP switching command for the CC 1, and activate the BWP 2 on the CC 2 based on the BWP switching command for the CC 2. Because the BWP switching commands may be lost during transmission, the terminal device 130 may receive only one of the BWP switching commands. Certainly, the network device 110 may send only one of the BWP switching commands to the terminal device 130 because the network device 110 makes a wrong decision. In this way, if a BWP switching mechanism in a single-carrier scenario in the prior art is still used, the terminal device 130 immediately performs the BWP switching as long as the terminal device 130 receives the BWP switching command. This may cause a BWP switching error or a subsequent signal transmission error. However, the communication method provided in this application can be used to optimize a problem of switching an active BWP in a carrier aggregation scenario.

Figure 5:
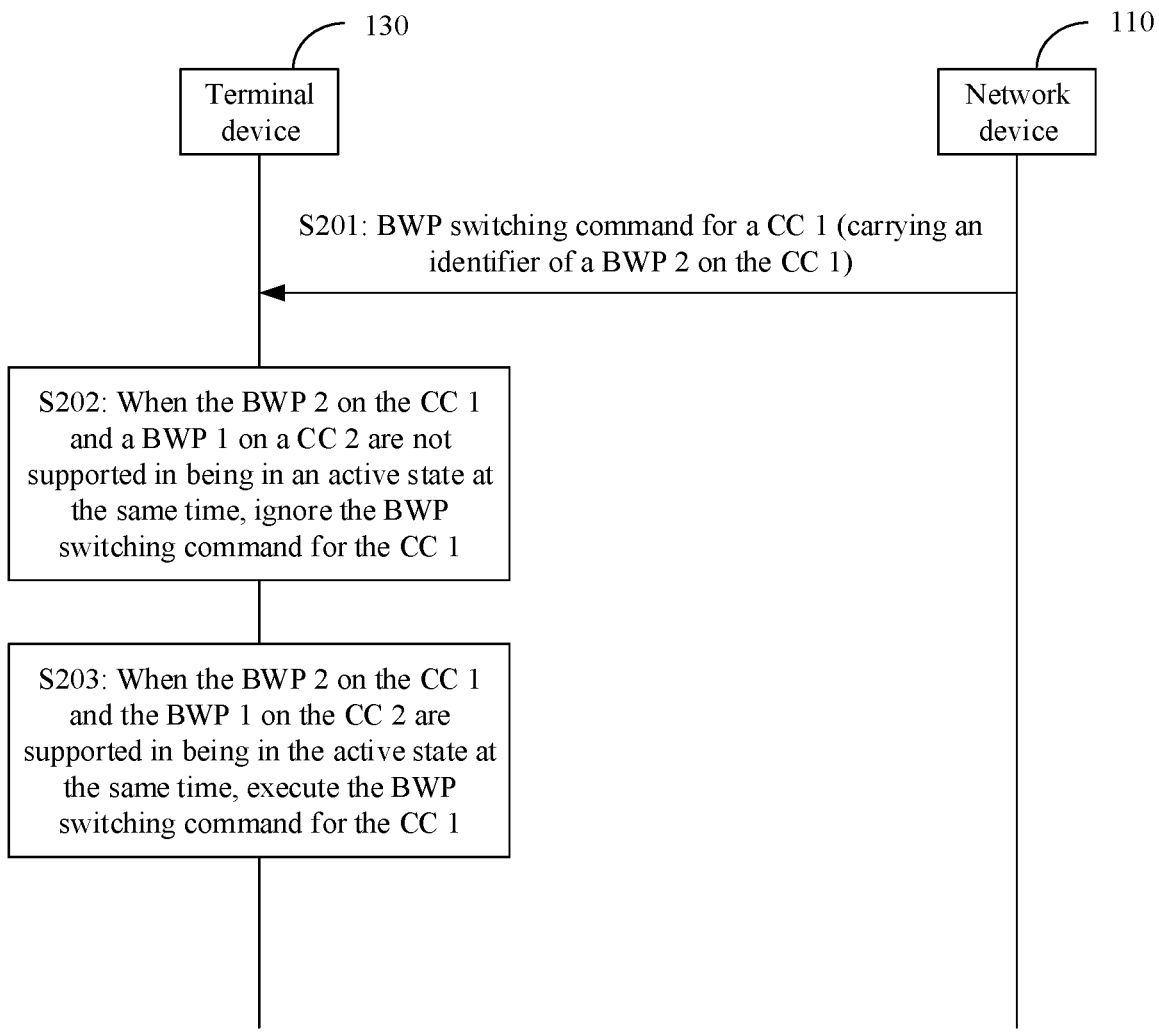
FIG. 5 is a schematic flowchart of another communication method according to an embodiment of this application.

The following describes the communication method provided in the embodiments of this application by using an example in which the network device 110 and the terminal device 130 are used, the first CC is the CC 1 shown in FIG. 4, the second CC is the CC 2 shown in FIG. 4, the first command is the BWP switching command for the CC 1, the first BWP is the BWP 2 on the CC 1 shown in FIG. 4, the first identifier is the identifier of the BWP 2 on the CC 1, and the second BWP is the BWP 1 on the CC 2 shown in FIG. 4. As shown in FIG. 5, the method includes the following steps.

S201: The terminal device 130 receives the BWP switching command that is for the CC 1 and that is sent by the network device 110. The BWP switching command carries the identifier of the BWP 2 on the CC 1, and the BWP switching command is used to activate the BWP 2 that is on the CC 1 and that is indicated by the identifier of the BWP 2 on the CC 1.

After receiving the BWP switching command for the CC 1, the terminal device 130 may determine, based on the capability of the terminal device 130, whether to support the BWP 2 on the CC 1 and the BWP 1 on the CC 2 in being in the active state at the same time. If the terminal device 130 does not support the BWP 2 on the CC 1 and the BWP 1 on the CC 2 in being in the active state at the same time, S202 is performed. If the terminal device 130 supports the BWP 2 on the CC 1 and the BWP 1 on the CC 2 in being in the active state at the same time, S203 is performed.

S202: When the terminal device 130 does not support the BWP 2 on the CC 1 and the BWP 1 on the CC 2 in being in the active state at the same time, the terminal device 130 ignores the BWP switching command for the CC 1.

S203: When the terminal device 130 supports the BWP 2 on the CC 1 and the BWP 1 on the CC 2 in being in the active state at the same time, the terminal device 130 executes the BWP switching command for the CC 1. The execution may also be understood as application. The executing the BWP switching command for the CC 1 includes activating the BWP 2 on the CC 1 and deactivating the BWP 1 on the CC 1.

Either S202 or S203 is performed. For the specific example in FIG. 4, S202 is performed in the foregoing method.

Figure 6:
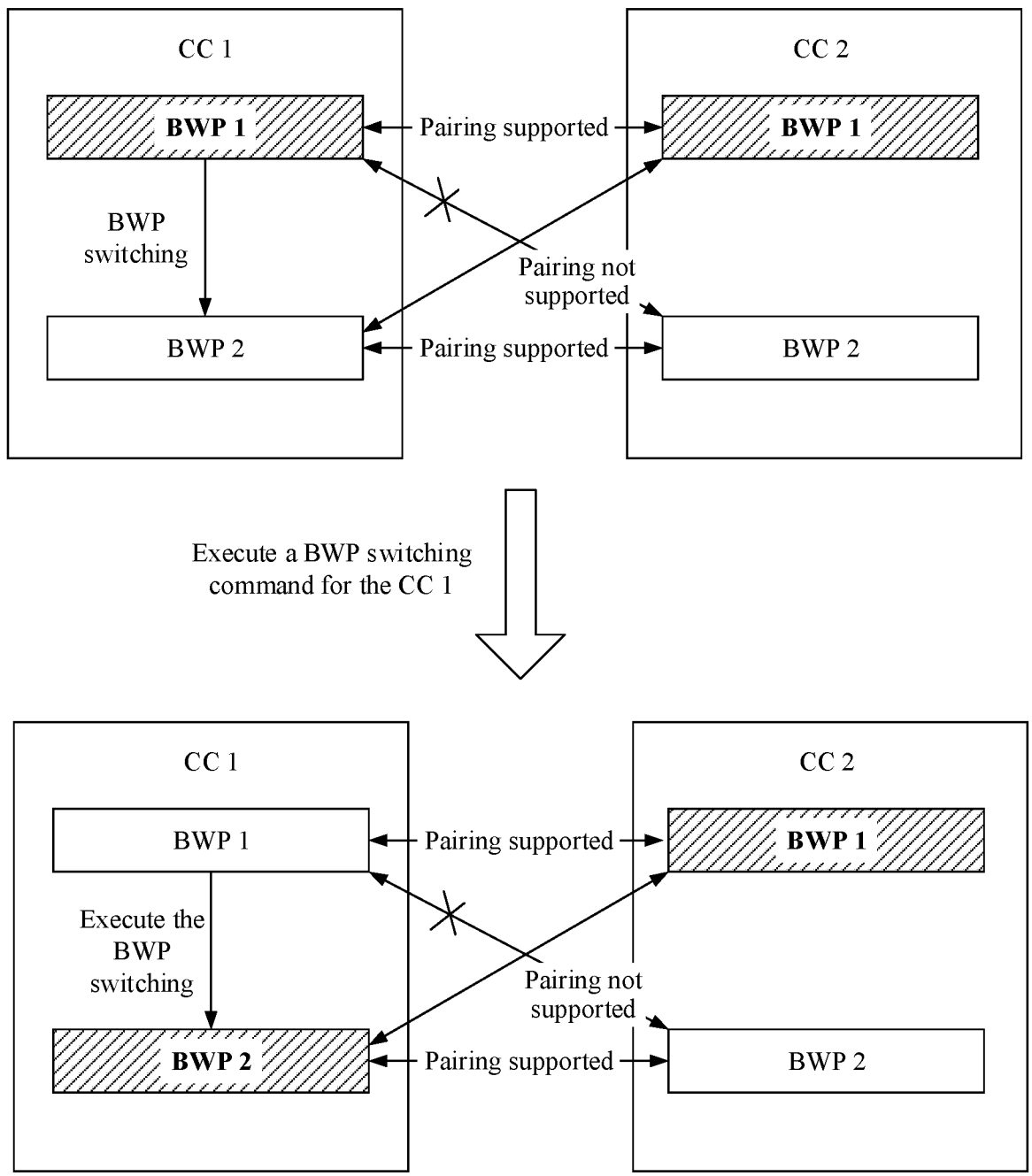
FIG. 6 is a schematic diagram of another configuration of a CC and a BWP according to an embodiment of this application.

In another specific example, it is assumed that a configuration of the CC and the BWP is still a configuration in FIG. 4. In addition, the BWP combination or the BWP pairing that can be supported by the terminal device 130 and that can be in the active state at the same time further includes the BWP 2 on the CC 1 and the BWP 1 on the CC 2. As shown in FIG. 6, in this example, S203 is performed in the foregoing method.

It should be noted that all BWPs marked as shadow in the accompanying drawings of this application are active BWPs, and no other limitation is imposed.

Optionally, the BWP switching command for the CC 1 may carry the identifier of the CC 1. Alternatively, an implicit identifier may be sent on the CC 1 to identify that the BWP switching command is for the CC 1. Referring to Table 2, Table 2 provides a possible format of the BWP switching command.

TABLE 2

| Carrier identifier (optional) | Identifier of a BWP | Scheduling information (indicating scheduling information of data in an active BWP) |
| --- | --- | --- |

Table 2 is merely an example for describing the format of the BWP switching command. During actual application, the format of the BWP switching command may further include other content. Details are not described in this application. For the specific example in FIG. 5, if Table 2 includes a carrier identifier field, the carrier identifier field is the identifier of the CC 1, a BWP identifier field is the identifier of the BWP 2 on the CC 1, and the scheduling information may indicate scheduling information of data in the BWP 2 on the CC 1.

The foregoing describes how the terminal device implements the method provided in this application when there is one first command, and there is also one second BWP and one second CC. The following further describes how to implement the method provided in this application when there are a plurality of first commands and there is one second BWP and one second CC. The following describes the communication method provided in this embodiment of this application by using an example in which the network device 110 and the terminal device 130 are used, there are two first commands, one second BWP, and one second CC, and the first command is a BWP switching command.

Figure 7:
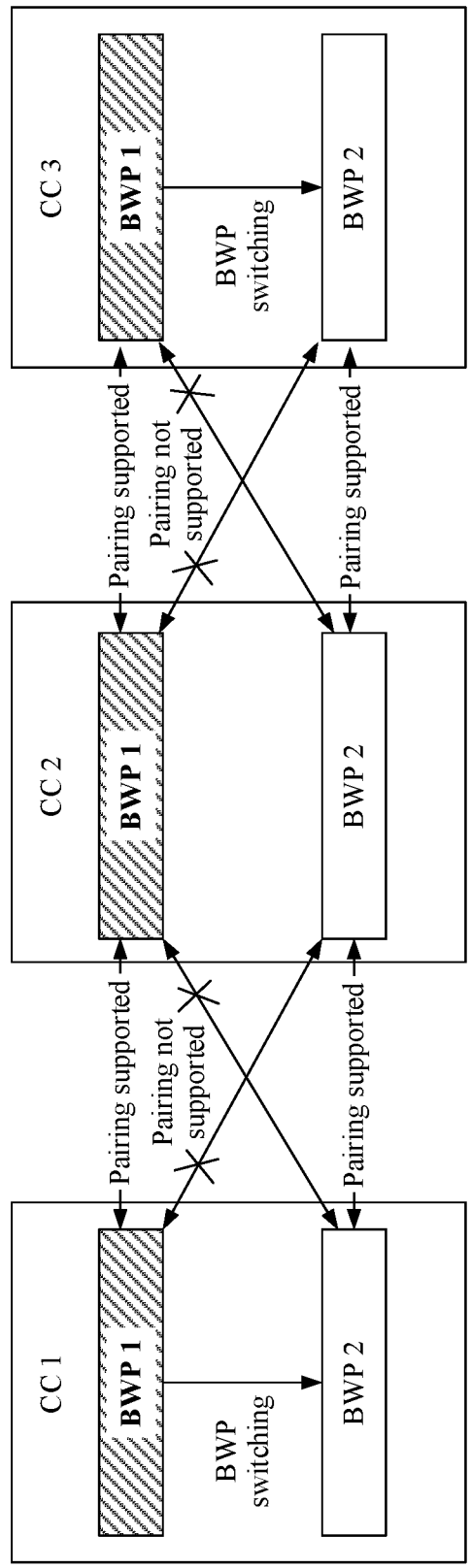
FIG. 7 is a schematic diagram of still another configuration of a CC and a BWP according to an embodiment of this application.

Referring to FIG. 7, the network device 110 in FIG. 7 configures three CCs for the terminal device 130: a CC 1, a CC 2, and a CC 3. Each CC includes two BWPs: a BWP 1 and a BWP 2. It is assumed that, BWPs that are in an active state and that are on the CC 1, the CC 2, and the CC 3 are all the BWPs 1. In this example, it is further assumed that, that the terminal device 130 may support a BWP combination or BWP pairing in being in the active state at the same time may include the BWP 2 on the CC 1, the BWP 2 on the CC 2, and the BWP 2 on the CC 3, and the BWP 1 on the CC 1, the BWP 1 on the CC 2, and the BWP 1 on the CC 3. That the terminal device 130 does not support the BWP combination or the BWP pairing in being in the active state at the same time may include the BWP 2 on the CC 1, the BWP 1 on the CC 2, the BWP 2 on the CC 3, the BWP 1 on the CC 1, the BWP 2 on the CC 2, the BWP 1 on the CC 3, and the like. Pairing other than the pairing supported by the terminal device 130 is pairing not supported, and is not listed one by one herein.

It may be understood that when there are the plurality of first commands, each first command carries one first identifier, and each first command corresponds to one first CC. In other words, there are also a plurality of first identifiers and a plurality of first CCs, and each first CC includes a first BWP. In other words, there are also a plurality of first BWPs.

Figure 8:
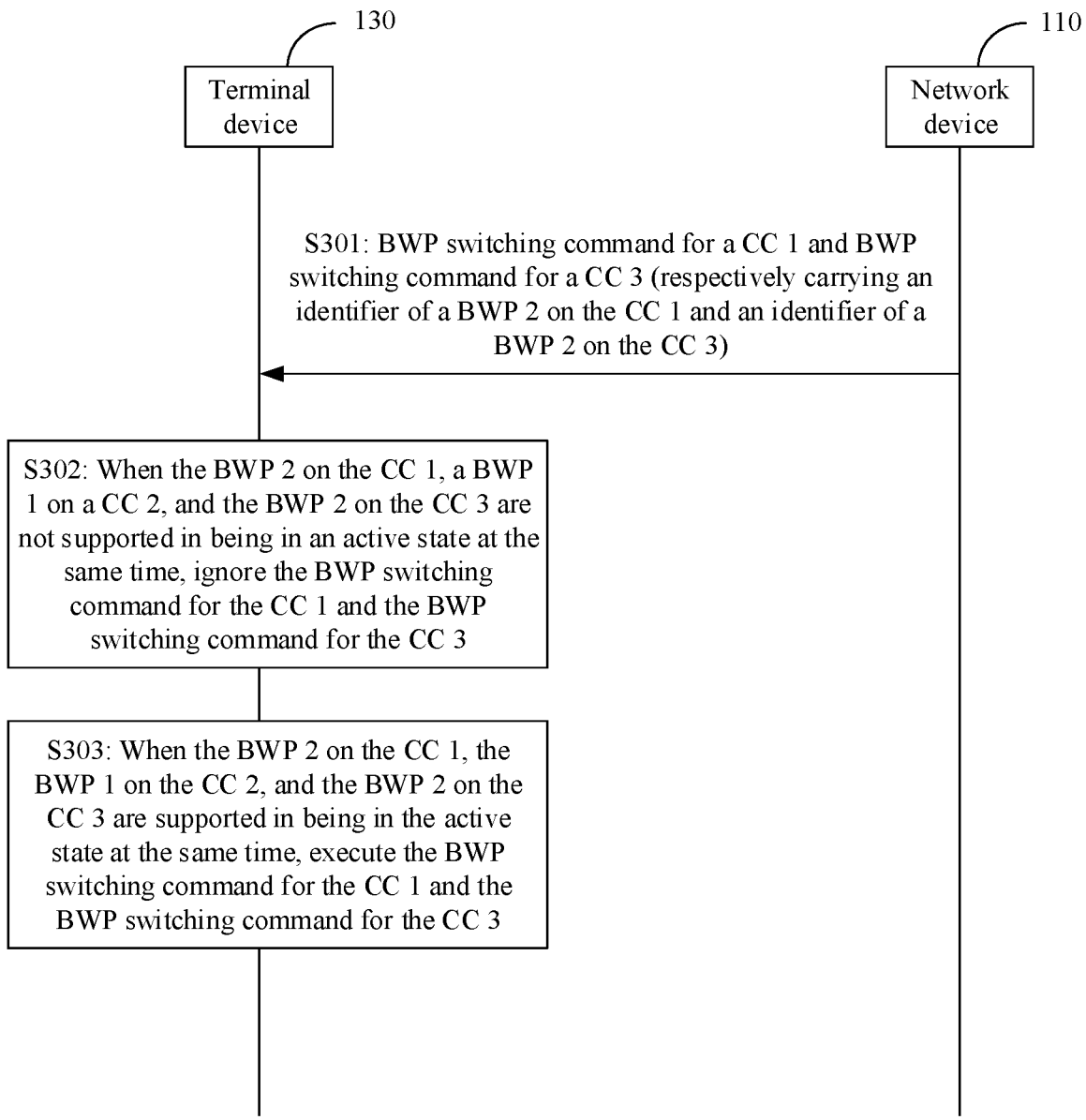
FIG. 8 is a schematic flowchart of still another communication method according to an embodiment of this application.

The following describes the communication method provided in this embodiment of this application by using an example the scenario in FIG. 7 is used and an example in which the first CCs are the CC 1 and the CC 3 shown in FIG. 7, the second CC is the CC 2 shown in FIG. 7, the first commands include a BWP switching command for the CC 1 and a BWP switching command for the CC 3, the first BWPs include the BWP 2 on the CC 1 and the BWP 2 on the CC 3 shown in FIG. 7, the two first identifiers respectively indicate the BWP 2 on the CC 1 and the BWP 2 on the CC 3, and the second BWP is the BWP 1 on the CC 2 shown in FIG. 7. As shown in FIG. 8, the method includes the following steps.

S301: The terminal device 130 receives the BWP switching command for the CC 1 and the BWP switching command for the CC 3 that are sent by the network device 110.

After receiving the BWP switching command for the CC 1 and the BWP switching command for the CC 3, the terminal device 130 may determine, based on the capability of the terminal device 130, whether to support the BWP 2 on the CC 1, the BWP 1 on the CC 2, and the BWP 2 on the CC 3 in being in the active state at the same time. If the terminal device 130 does not support the BWP 2 on the CC 1, the BWP 1 on the CC 2, and the BWP 2 on the CC 3 in being in the active state at the same time, S302 is performed. If the terminal device 130 supports the BWP 2 on the CC 1, the BWP 1 on the CC 2, and the BWP 2 on the CC 3 in being in the active state at the same time, S303 is performed. Either S302 or S303 is performed. For the specific example in FIG. 7, S302 is performed in the foregoing method.

S302: When the terminal device 130 does not support the BWP 2 on the CC 1, the BWP 1 on the CC 2, and the BWP 2 on the CC 3 in being in the active state at the same time, the terminal device 130 ignores the BWP switching command for the CC 1 and the BWP switching command for the CC 3.

S303: When the terminal device 130 supports the BWP 2 on the CC 1, the BWP 1 on the CC 2, and the BWP 2 on the CC 3 in being in the active state at the same time, the terminal device 130 executes the BWP switching command for the CC 1 and the BWP switching command for the CC 3.

Figure 9:
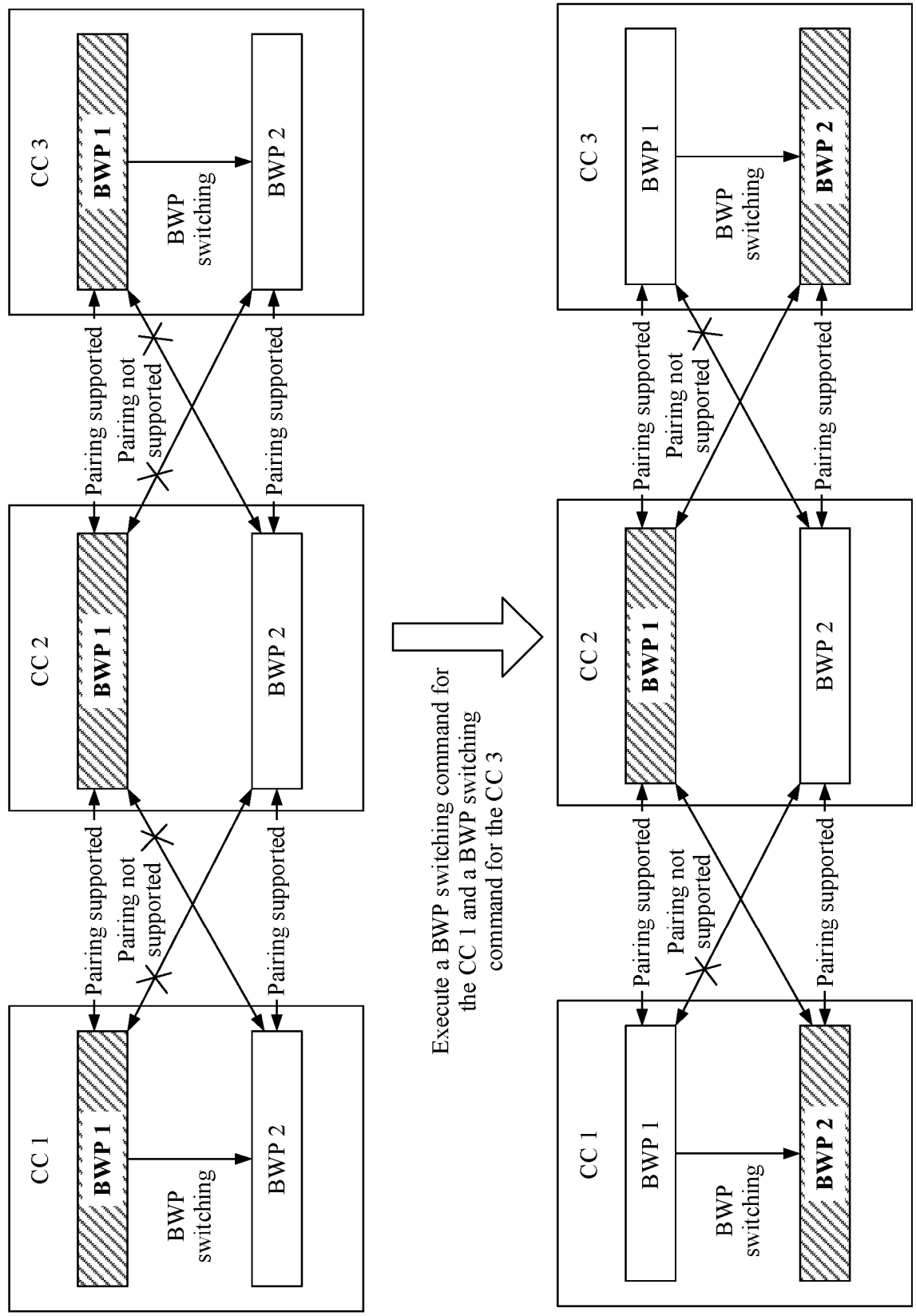
FIG. 9 is a schematic diagram of still another configuration of a CC and a BWP according to an embodiment of this application.

In another specific example, it is assumed that a configuration of the CC and the BWP is still a configuration in FIG. 7. In addition, the BWP combination or pairing that can be supported by the terminal device 130 and that is in the active state at the same time further includes the BWP 2 on the CC 1, the BWP 1 on the CC 2, and the BWP 2 on the CC 3. As shown in FIG. 9, in this example, S303 is performed in the foregoing method.

In this application, a case in which there are a plurality of first commands and there are a plurality of second BWPs and second CCs is similar to an implementation in which there are a plurality of first commands and there is one second BWP and one second CC. Details are not described again in this application.

Optionally, after ignoring the first command, the terminal device may further feed back, to the network device, that the received first command does not take effect. For example, the terminal device may send a first indication to the network device, where the first indication is used to indicate that the first command does not take effect. For another example, the terminal device may alternatively send a negative acknowledgement NACK message for the first command to the network device. For still another example, the terminal device may alternatively not feed back any information to the network device.

Optionally, the first indication may carry the first identifier. The first indication may be RRC signaling or a MAC CE.

In addition, an embodiment of this application further provides another communication method, to optimize a problem of switching an active BWP in a carrier aggregation scenario.

Figure 10:
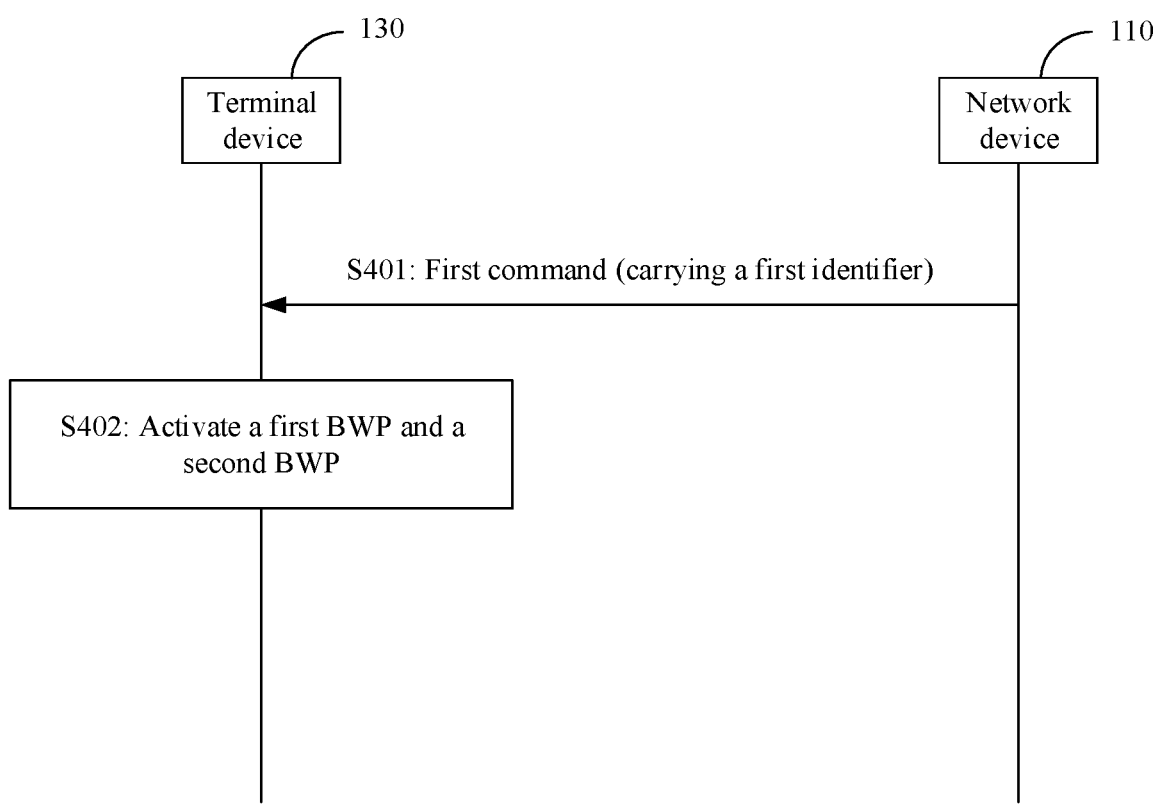
FIG. 10 is a schematic flowchart of still another communication method according to an embodiment of this application.

The following uses the network device 110 and the terminal device 130 as an example to describe the another communication method provided in this embodiment of this application. As shown in FIG. 10, the method includes the following steps.

S401: The terminal device 130 receives a first command sent by the network device 110. The first command carries a first identifier, the first command is used to activate a first BWP indicated by the first identifier, and the first BWP is a BWP on a first CC.

For explanations and descriptions of the first command, the first identifier, the first CC, and a second CC, refer to descriptions of the first command, the first identifier, the first CC, and the second CC in the method provided in FIG. 3. Details are not described herein again.

S402: The terminal device 130 activates the first BWP and a third BWP, where there is an association relationship between the first BWP and the third BWP, and the third BWP is a BWP on the second CC.

The first CC and the second CC may be different or may be same. This is not limited in this application.

After receiving the first command, the terminal device 130 activates, based on the first command, the first BWP indicated by the first identifier, and activates the third BWP based on the association relationship between the first BWP and the third BWP.

Optionally, the third BWP is the BWP in an inactive state on the second CC.

Optionally, that there is an association relationship between the first BWP and the third BWP may include: That the terminal device 130 supports the first BWP and the third BWP in being in an active state at the same time may also be understood as that the terminal device 130 supports the first BWP and the third BWP in working at the same time.

Optionally, the association relationship may be configured by the network device 110 for the terminal device 130, or may be prestored by the terminal device 130. When the association relationship is configured for the terminal device 130, before activating the first BWP and the third BWP, the terminal device 130 may further receive the association relationship sent by the network device 110. Before sending the association relationship to the terminal device 130, the network device 110 may further determine the association relationship. For example, the network device 110 may determine the association relationship based on parameters of a plurality of BWPs configured for the terminal device 130. For example, the network device 110 may determine BWPs with a same SCS and/or CP as a group of BWPs that have an association relationship.

Optionally, the association relationship may include an association relationship identifier and an identifier, of the BWP, that corresponds to the association relationship identifier. For example, the association relationship between the first BWP and the third BWP may include the association relationship identifier used to indicate the association relationship, and identifiers of the first BWP and the third BWP.

In the communication method shown in FIG. 10, there may be one or more first commands. When there are a plurality of first commands, the foregoing method may be separately performed for each first command. This application mainly describes a case in which there is one first command. Details are not described again for a case in which there are the plurality of first commands.

The following describes the another communication method provided in this embodiment of this application by using an example in which the network device 110 and the terminal device 130 are used, there is one first command and one third BWP, and the first command is a BWP switching command.

Figure 11:
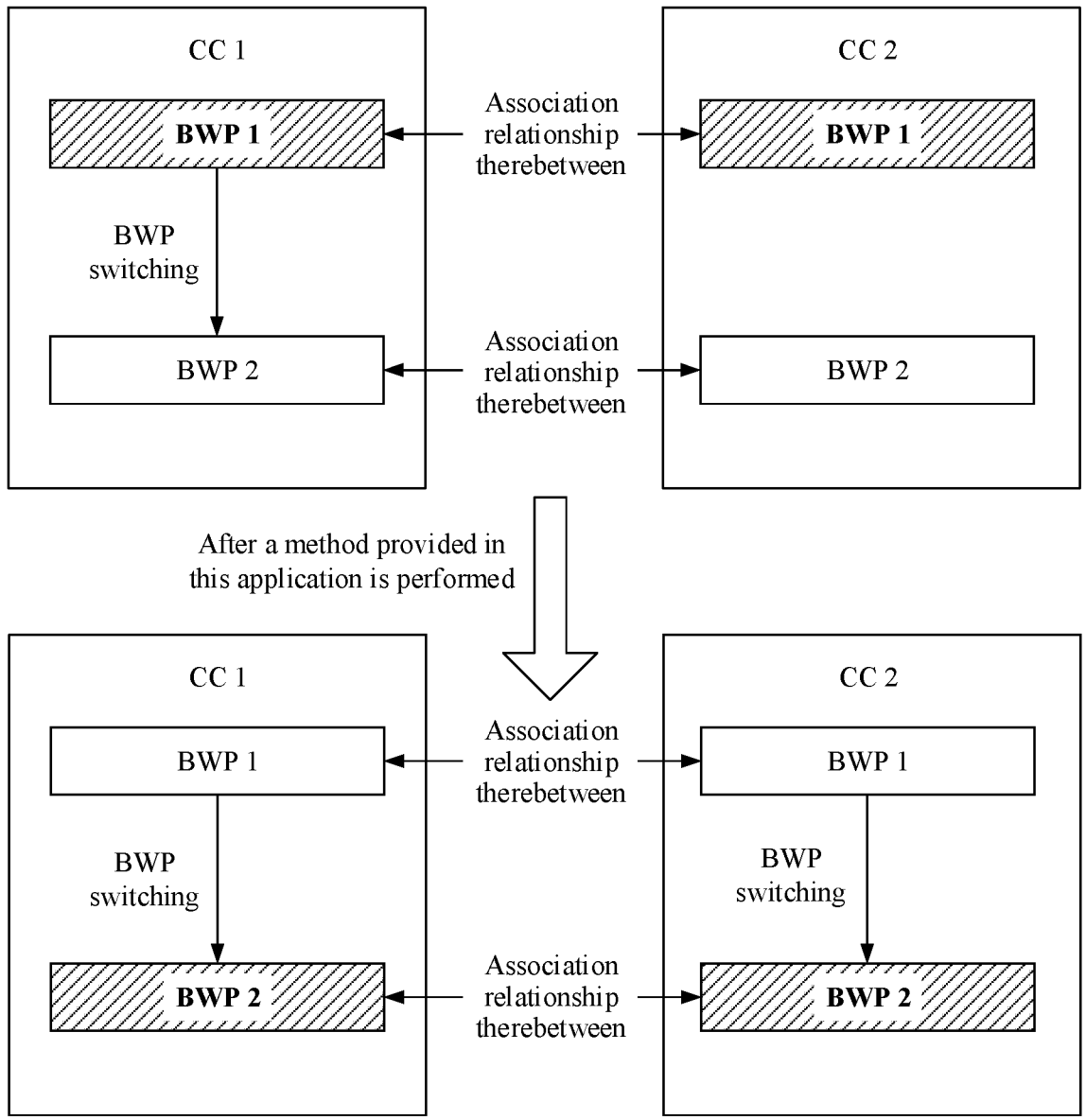
FIG. 11 is a schematic diagram of still another configuration of a CC and a BWP according to an embodiment of this application.

Referring to FIG. 11, a configuration of the terminal device 130 by the network device 110 in FIG. 11 is the same as that in FIG. 4. A difference lies in that in FIG. 11, a BWP 2 on a CC 1 and a BWP 2 on a CC 2 are configured to have an association relationship, and a BWP 1 on the CC 1 and a BWP 1 on the CC 2 are configured to have an association relationship.

Figure 12:
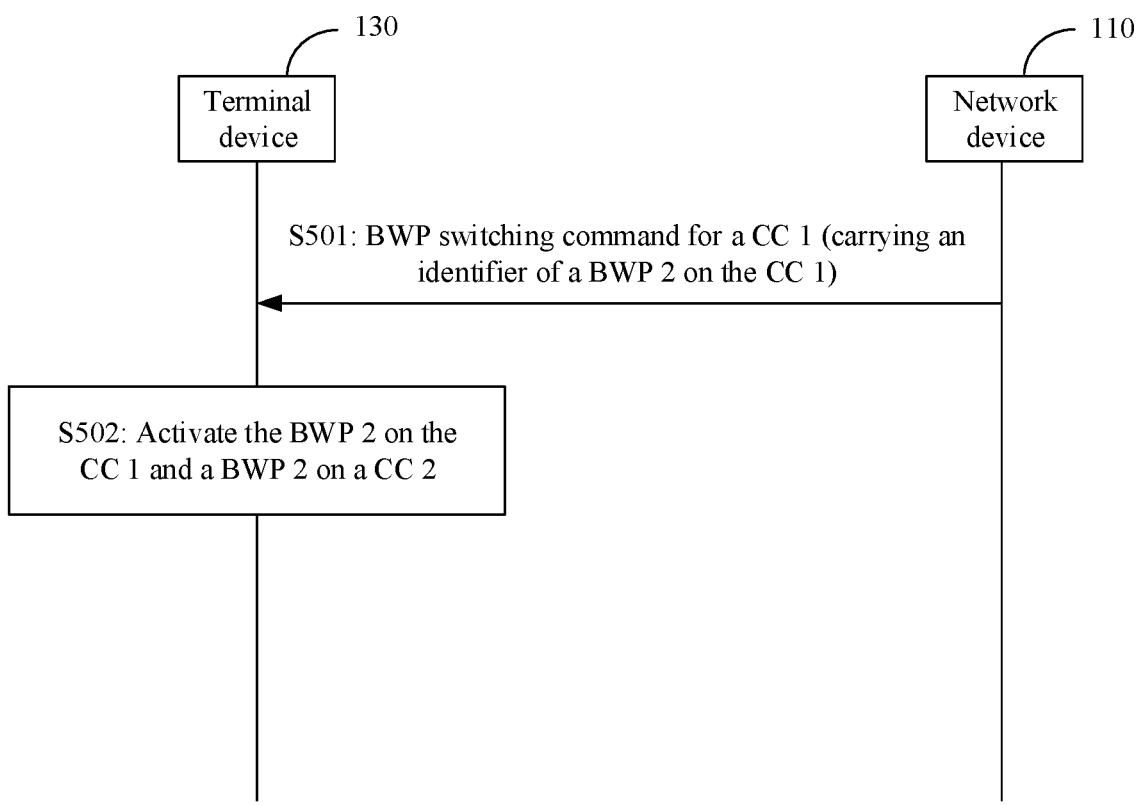
FIG. 12 is a schematic flowchart of still another communication method according to an embodiment of this application.

The following describes the another communication method provided in this embodiment of this application by using an example in which the network device 110 and the terminal device 130 are used, the first CC is the CC 1 shown in FIG. 11, the second CC is the CC 2 shown in FIG. 11, the first command is the BWP switching command for the CC 1, the first BWP is the BWP 2 on the CC 1 shown in FIG. 11, the first identifier is the identifier of the BWP 2 on the CC 1, and the third BWP is the BWP 2 on the CC 2 shown in FIG. 11. As shown in FIG. 12, the method includes the following steps.

S501: The terminal device 130 receives the BWP switching command that is for the CC 1 and that is sent by the network device 110, where the BWP switching command carries the identifier of the BWP 2 on the CC 1, and the BWP switching command is used to activate the BWP 2 on the CC 1 indicated by the identifier of the BWP 2 on the CC 1.

S502: The terminal device 130 activates the BWP 2 on the CC 1 and the BWP 2 on the CC 2.

After receiving the BWP switching command for the CC 1, the terminal device 130 activates the BWP 2 on the CC 1 based on the BWP switching command for the CC 1, and activates the BWP 2 on the CC 2 based on the association relationship between the BWP 2 on the CC 1 and the BWP 2 on the CC 2. In addition, when activating a new BWP 2, the terminal device 130 further needs to deactivate the BWP 1. As shown in FIG. 11, according to the method in this application, the terminal device 130 not only switches an active BWP on the CC 1, but also needs to switch an active BWP on the CC 2. In this way, even if the terminal device 130 does not receive the BWP switching command for the CC 2, the terminal device 130 performs BWP switching on the CC 2, so that finally, a combination of the active BWPs on the CC 1 and the CC 2 is a BWP pairing that is in the active state at the same time and that is supported by the terminal device 130.

In a possible implementation, there are a plurality of third BWPs on a same second CC. In this implementation, before activating the first BWP and the third BWP, the terminal device 130 may further receive an association relationship identifier sent by the network device 110. The association relationship identifier indicates an association relationship between the first BWP and a specific third BWP, and the specific third BWP is a BWP included in the plurality of third BWPs. In this implementation, that the terminal device 130 activates the first BWP and the third BWP includes: the terminal device 130 activates the first BWP and the specific third BWP.

It should be noted that if there is the association relationship between the first BWPs and the plurality of third BWPs, the association relationship between the first BWP and each third BWP corresponds to one association relationship identifier.

The following describes the another communication method provided in this embodiment of this application by using an example in which the network device 110 and the terminal device 130 are used, there is one first command, there are a plurality of third BWPs on the second CC, and the first command is a BWP activation command.

Figure 13:
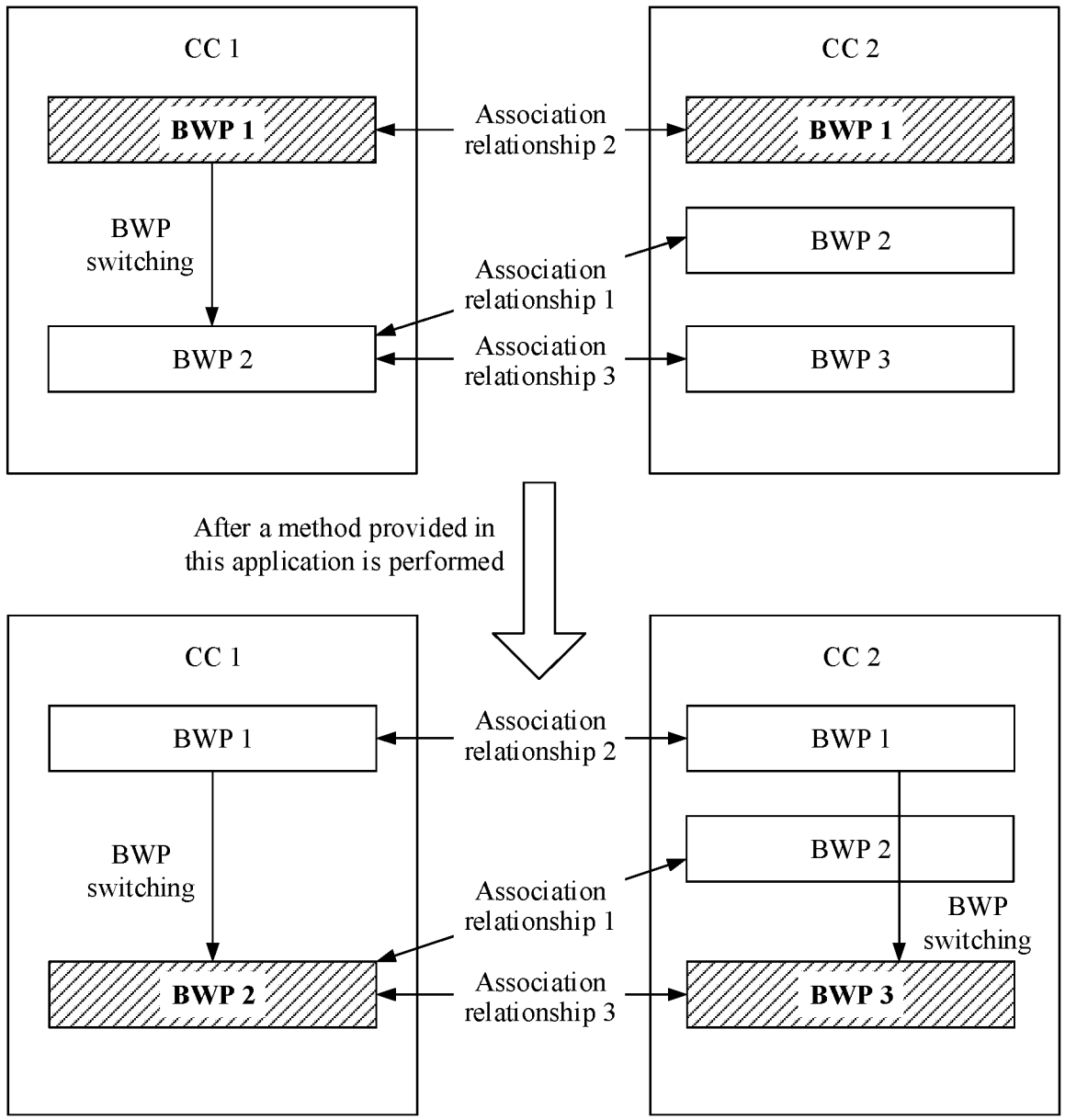
FIG. 13 is a schematic diagram of still another configuration of a CC and a BWP according to an embodiment of this application.

Referring to FIG. 13, the network device 110 in FIG. 13 configures two CCs for the terminal device 130: a CC 1 and a CC 2. The CC 1 includes two BWPs: a BWP 1 and a BWP 2. The CC 2 includes three BWPs: a BWP 1, a BWP 2, and a BWP 3. It is assumed that BWPs that are in an active state and that are on the CC 1 and the CC 2 both are the BWPs 1. In addition, in FIG. 13, the BWP 2 on the CC 1 and the BWP 2 on the CC 2 are configured to have an association relationship, the BWP 1 on the CC 1 and the BWP 1 on the CC 2 are configured to have an association relationship, and the BWP 2 on the CC 1 and the BWP 3 on the CC 2 are configured to have an association relationship. For ease of description, the association relationship between the BWP 2 on the CC 1 and the BWP 2 on the CC 2 is denoted as an association relationship 1, the association relationship between the BWP 1 on the CC 1 and the BWP 1 on the CC 2 is denoted as an association relationship 2, and the association relationship between the BWP 2 on the CC 1 and the BWP 3 on the CC 2 is denoted as an association relationship 3.

Figure 14:
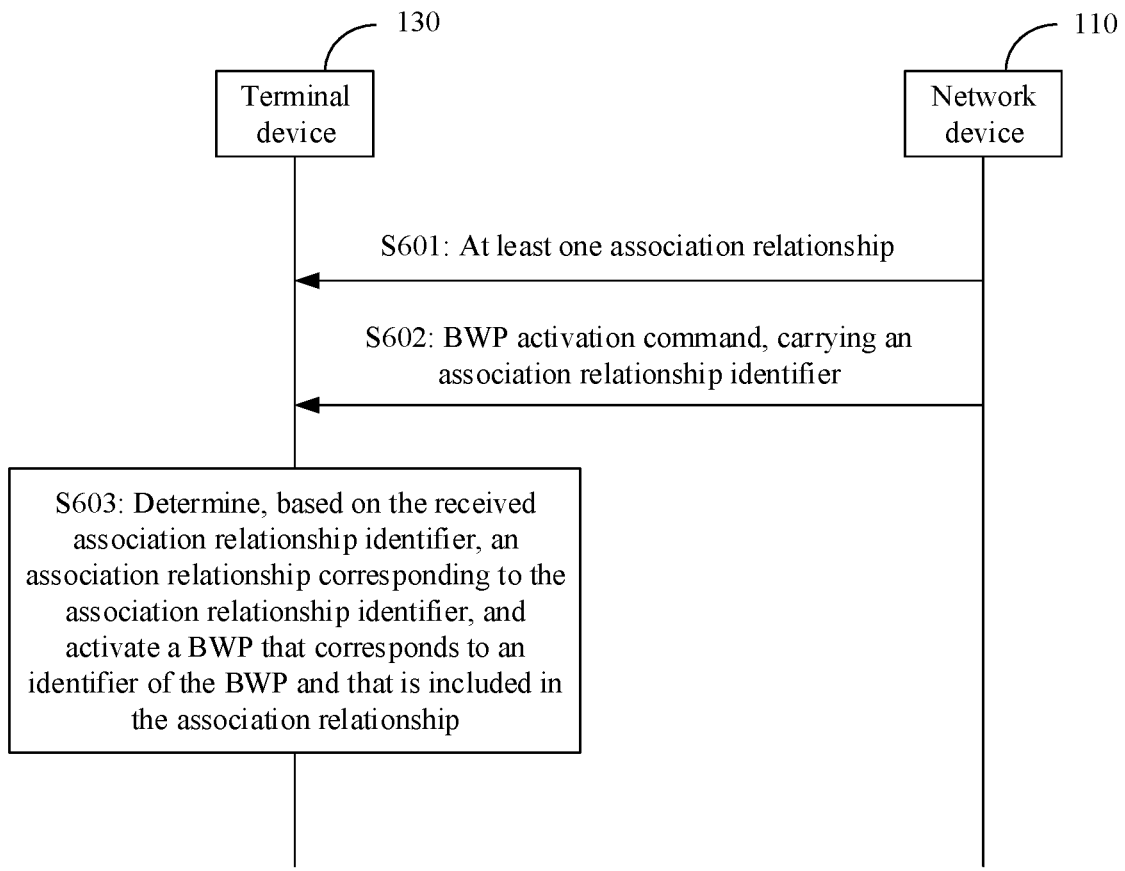
FIG. 14 is a schematic flowchart of still another communication method according to an embodiment of this application.

The following describes the another communication method provided in this embodiment of this application by using an example in which the network device 110 and the terminal device 130 are used, the first CC is the CC 1 shown in FIG. 13, the second CC is the CC 2 shown in FIG. 13, the first command is the BWP activation command for the CC 1, the first BWP is the BWP 2 on the CC 1 shown in FIG. 13, the first identifier is the identifier of the BWP 2 on the CC 1, and the third BWPs include the BWP 2 and the BWP 3 on the CC 2 shown in FIG. 13. As shown in FIG. 14, the method includes the following steps.

S601: The terminal device 130 receives at least one association relationship configured by the network device 110. Each association relationship includes an association relationship identifier and an identifier, of the BWP, that corresponds to the association relationship identifier.

For example, for the configuration in FIG. 13, the terminal device 130 may receive the three association relationships sent by the network device 110. The association relationship 1 may include an association relationship identifier A used to indicate the association relationship 1, and identifiers of the BWP 2 on the CC 1 and the BWP 2 on the CC 2. The association relationship 2 may include an association relationship identifier B used to indicate the association relationship 2, and identifiers of the BWP 1 on the CC 1 and the BWP 1 on the CC 2. The association relationship 3 may include an association relationship identifier C used to indicate the association relationship 3, and identifiers of the BWP 2 on the CC 1 and the BWP 3 on the CC 2.

Optionally, the association relationships may be received by using RRC signaling, MAC layer signaling, or physical layer signaling. This is not limited in this application.

Optionally, the CC 1 and the CC 2 may be different or may be same. This is not limited in this application.

Optionally, the association relationships may alternatively be associated with CC identifiers. For example, an association relationship for each CC may be configured for the CC. For example, the association relationship 1 sent on the CC 1 is used to indicate that the associated BWPs are the BWP 1 on the CC 1 and the BWP 1 on the CC 2. The association relationship 1 sent on the CC 2 is used to indicate that the associated BWPs are the BWP 2 on the CC 1 and the BWP 2 on the CC 2.

It should be noted that S601 is an optional step. S601 may be performed once each time the method is implemented. Certainly, S601 may also be performed once when the method is implemented for the first time, and the terminal device 130 may store the plurality of association relationships, to be used in subsequent implementation of the method.

S602: The terminal device 130 receives the BWP activation command sent by the network device 110, where the BWP activation command carries the association relationship identifier. For example, the BWP activation command may carry the association relationship identifier C.

Optionally, the BWP activation command may be RRC signaling, MAC layer signaling, or physical layer signaling.

Referring to Table 3, Table 3 provides a possible format of the BWP activation command.

TABLE 3

| Identifier of a CC (optional) | Association relationship identifier |
| --- | --- |

Table 3 is merely an example for describing the format of the BWP activation command. During actual application, the format of the BWP activation command may further include other content. Details are not described in this application. For the specific examples in FIG. 13 and FIG. 14, if Table 3 includes a CC identifier field, the CC identifier field is the identifier of the CC 1.

S603: The terminal device 130 determines, based on the received association relationship identifier, the association relationship corresponding to the association relationship identifier, and activates the BWP that corresponds to the identifier of the BWP and that is included in the association relationship.

For example, it is assumed that the association relationship identifier received by the terminal device 130 in S602 is the association relationship identifier C. In this case, the terminal device 130 may determine, based on the association relationship identifier C, that the corresponding association relationship is the association relationship 3, and may further activate the BWPs corresponding to the identifiers, of the BWP 2 on the CC 1 and the BWP 3 on the CC 2, that are included in the association relationship 3.

Optionally, the terminal device 130 may determine, based on the association relationship identifier and the identifier, of the CC, that is for sending the BWP activation command carrying the association relationship identifier, the BWP corresponding to the association relationship identifier. For example, if the terminal device 130 receives the BWP activation command on the CC 1, and the BWP activation command includes the association relationship identifier 1, the terminal device 130 determines the BWP corresponding to the association relationship identifier 1 corresponding to the CC 1, and activates the BWP.

It should be noted that when activating a new BWP, the terminal device 130 may further perform a deactivation operation on the BWP that is in the active state before the BWP activation command is executed.

According to the foregoing method, the terminal may activate the plurality of BWPs on the plurality of CCs or the plurality of BWPs on one CC based on one BWP activation command. The terminal device 130 may activate not only the BWPs on the CC 1, but also the BWPs on the CC 2. In this way, even if the terminal device 130 does not receive the BWP activation command for the CC 2, the terminal device 130 performs BWP switching on the CC 2 based on the association relationship, so that finally, a combination of the active BWPs on the CC 1 and the CC 2 is a BWP pairing that is in the active state at the same time and that is supported by the terminal device 130.

Figure 15:
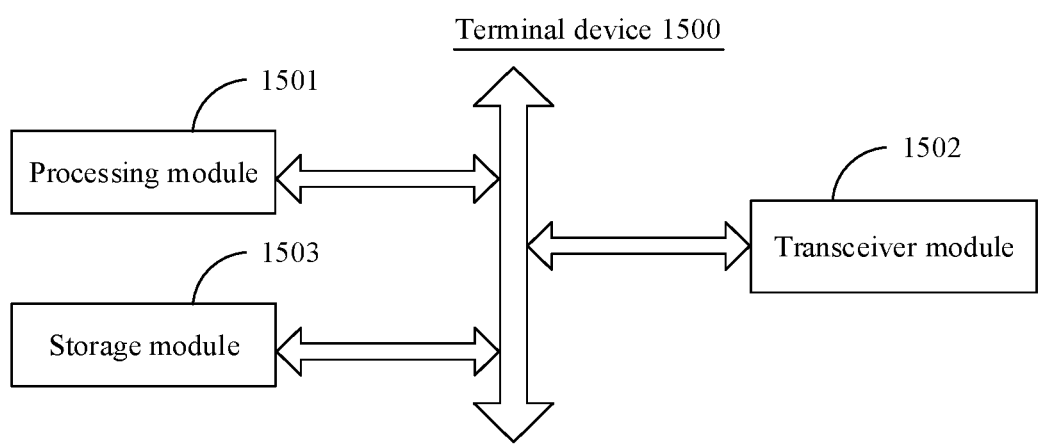
FIG. 15 is a schematic structural diagram of a terminal device according to an embodiment of this application.

Based on a same inventive concept, an embodiment of this application further provides a terminal device. The terminal device may have a structure shown in FIG. 15, and has behavior functions of the terminal device 130 in the foregoing method embodiments. As shown in FIG. 15, the terminal device 1500 may include a processing module 1501 and a transceiver module 1502. During implementation, the terminal device 1500 may further include a storage module 1503. The storage module 1503 may be coupled to the processing module 1501, and is configured to store a program and an instruction that are needed by the processing module 1501 to perform functions.

Based on the communication method shown in FIG. 3, the processing module 1501 in the terminal device 1500 shown in FIG. 15 may be configured to for the terminal device 1500 to perform the steps shown in S102 or S103, and the transceiver module 1502 may be configured to for the terminal device 1500 to perform the steps shown in S101.

In a possible design, in S101, there may be a plurality of first commands, and each first command corresponds to one first CC. In this design, that the processing module 1501 is configured to determine that the processing module 1501 does not support the first BWP and a second BWP in being in the active state at the same time includes:

The processing module 1501 is configured to determine that the processing module does not support a plurality of first BWPs and a plurality of second BWPs in being in an active state at the same time, where the plurality of first BWPs are first BWPs that are indicated by the first identifier and that are respectively carried in the plurality of first commands; and that the processing module 1501 is configured to ignore the first command includes:

the processing module 1501 is configured to ignore the plurality of first BWPs.

In a possible design, there are a plurality of second BWPs and a plurality of second CCs. In this design, that the processing module 1501 is configured to determine that the processing module 1501 does not support the first BWP and a second BWP in being in an active state at the same time includes:

The processing module 1501 is configured to determine that the processing module does not support the plurality of first BWPs and the plurality of second BWPs in being in the active state at the same time.

In a possible design, the first command may include a BWP activation command, a BWP switching command, or a secondary cell activation command.

In a possible design, the transceiver module 1502 is further configured to send a first indication to the network device, where the first indication is used to indicate that the first command does not take effect; or the transceiver module 1502 is further configured to send a negative acknowledgement NACK message for the first command to the network device.

In a possible design, the first indication carries the first identifier.

In a possible design, the first command carries a second identifier, and the second identifier is used to identify the first CC.

Based on the communication method shown in FIG. 10, the processing module 1501 in the terminal device 1500 shown in FIG. 15 may be configured to for the terminal device 1500 to perform the steps shown in S402, and the transceiver module 1502 may be configured to for the terminal device 1500 to perform the steps shown in S401.

In a possible design, in S402, that there is an association relationship between the first BWP and a third BWP includes: The processing module 1501 supports the first BWP and the third BWP in being in an active state at the same time.

In a possible design, there are a plurality of third BWPs on a same second CC. In this design, the processing module 1501 is further configured to: before activating the first BWP and the third BWP, receive, through the transceiver module 1502, an association relationship identifier sent by the network device, where the association relationship identifier indicates an association relationship between the first BWP and a specific third BWP, and the specific third BWP is a BWP included in the plurality of third BWPs; and activate the first BWP and the specific third BWP.

In a possible design, the processing module 1501 is further configured to: before activating the first BWP and the third BWP, receive, through the transceiver module 1502, the association relationship sent by the network device.

In a possible design, the association relationship is pre-stored by the processing module 1501.

In a possible design, the first command may include a BWP activation command, a BWP switching command, or a secondary cell activation command.

In a possible design, the first command carries a second identifier, and the second identifier is used to identify the first CC.

Figure 16:
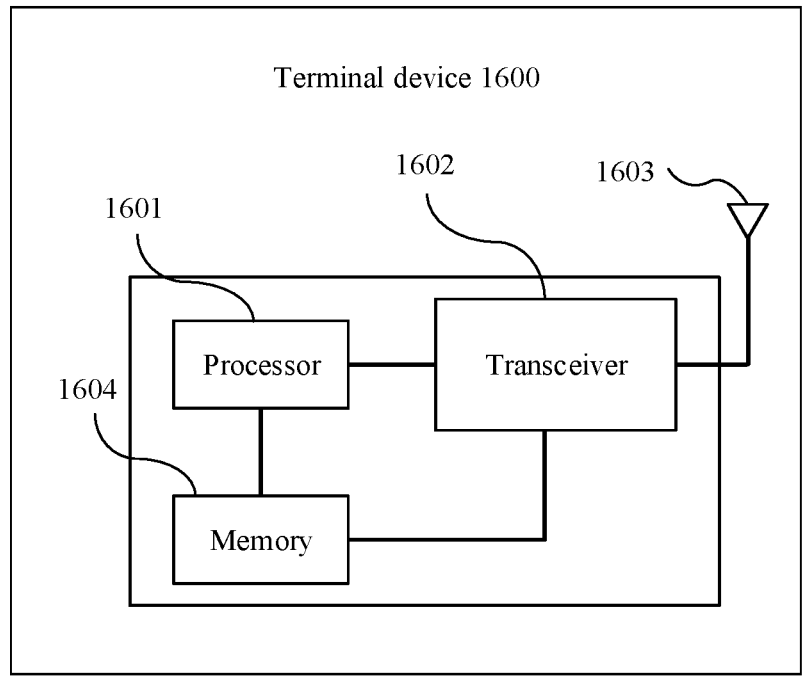
FIG. 16 is a schematic structural diagram of another terminal device according to an embodiment of this application.

In addition, the terminal device in this embodiment of this application may further have a structure of a terminal device 1600 shown in FIG. 16. A processor 1601 in the terminal device 1600 shown in FIG. 16 may be configured to implement the functions of the processing module 1501. For example, the processor 1601 may be configured for the terminal device 1600 to perform the steps shown in S102 and/or S402. The transceiver 1602 may be configured to implement the functions of the transceiver module 1502. For example, the transceiver 1602 may be configured for the terminal device 1600 to perform the steps shown in S101 and/or S401. In addition, the transceiver 1602 may be coupled to an antenna 1603, and is configured to support the terminal device 1600 in performing communication. For example, the terminal device 1600 may further include a memory 1604, and the memory 1604 stores a computer program and an instruction. The memory 1604 may be coupled to the processor 1601 and/or the transceiver 1602, and is configured to support the processor 1601 in invoking the computer program and the instruction in the memory 1604 to implement the steps related to the terminal device 1600 in the methods provided in the embodiments of this application. In addition, the memory 1604 may be further configured to store data in the method embodiments of this application. For example, the memory 1604 is configured to store data and an instruction that are necessary for supporting the transceiver 1602 in implementing interaction, and/or is configured to store configuration information that is necessary for the terminal device 1600 to perform the methods in the embodiments of this application.

Figure 17:
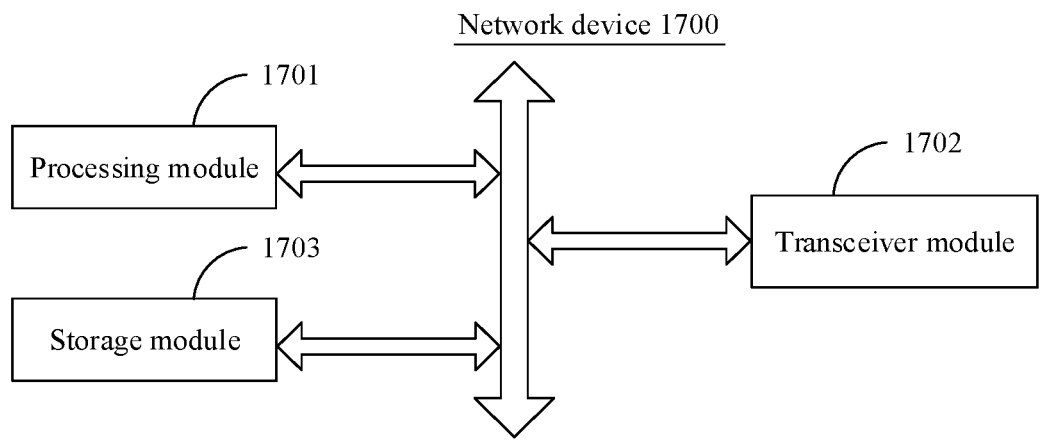
FIG. 17 is a schematic structural diagram of a network device according to an embodiment of this application.

Based on a same inventive concept, an embodiment of this application further provides a network device. The network device may have a structure shown in FIG. 17, and has behavior functions of the network device 110 in the foregoing method embodiments. As shown in FIG. 17, the network device 1700 may include a processing module 1701 and a transceiver module 1702. During implementation, the network device 1700 may further include a storage module 1703. The storage module 1703 may be coupled to the processing module 1701, and is configured to store a program and an instruction that are needed by the processing module 1701 to perform functions.

Based on the communication method shown in FIG. 3, the transceiver module 1702 in the network device 1700 shown in FIG. 17 may be configured to for the network device to perform the steps shown in S101, and perform receiving of the first indication sent by the terminal device, or receiving of the negative acknowledgement NACK message that is sent by the terminal device and that is specific to the first command.

In a possible design, there may be a plurality of first commands, and each first command corresponds to one first CC.

In a possible design, the first command may include a BWP activation command, a BWP switching command, or a secondary cell activation command.

In a possible design, the first indication carries the first identifier.

In a possible design, the first command carries a second identifier, and the second identifier is used to identify the first CC.

Based on the communication method shown in FIG. 10, the processing module 1701 in the network device 1700 shown in FIG. 17 may be configured for the network device 1700 to determine the association relationship and send the association relationship to the terminal device, and the transceiver module 1702 may be configured for the network device 1700 to perform the steps shown in S401.

In a possible design, that there is the association relationship between the first BWP and a third BWP in S401 and S402 includes:

The processing module 1701 supports the first BWP and the third BWP in being in an active state at the same time.

In a possible design, there are a plurality of third BWPs on a same second CC. In this design, the processing module 1701 is further configured to: send an association relationship identifier to the terminal device through the transceiver module 1702, where the association relationship identifier indicates an association relationship between the first BWP and a specific third BWP, and the specific third BWP is a BWP included in the plurality of third BWPs.

In a possible design, the processing module 1701 is specifically configured to:

determine the association relationship based on parameters of a plurality of BWPs configured for the terminal device.

In a possible design, the first command may include a BWP activation command, a BWP switching command, or a secondary cell activation command.

In a possible design, the first command carries a second identifier, and the second identifier is used to identify the first CC.

Figure 18:
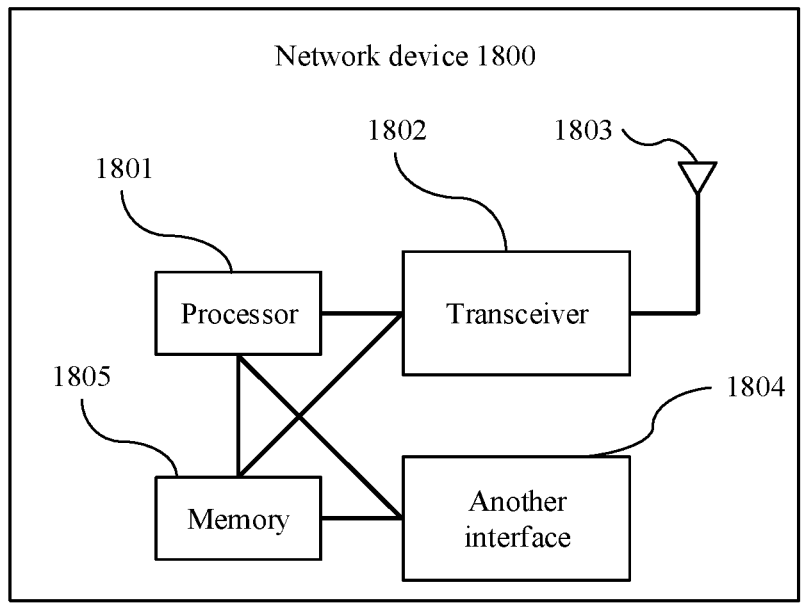
FIG. 18 is a schematic structural diagram of another network device according to an embodiment of this application.

In addition, the network device in this embodiment of this application may further have a structure of a network device 1800 shown in FIG. 18. A processor 1801 in the network device 1800 shown in FIG. 18 may be configured to implement the functions of the processing module 1701. For example, the processor 1801 may be configured for the network device 1800 to perform the steps such as determining the association relationship between the first BWP and the second BWP. The transceiver 1802 may be configured to implement the functions of the transceiver module 1702. For example, the transceiver 1802 may be configured for the network device 1800 to perform the steps shown in S101 and/or S401. In addition, the transceiver 1802 may be coupled to an antenna 1803, and is configured to support the network device 1800 in performing communication. For example, the network device 1800 may further include another interface 1804, configured to support the network device 1800 in performing interaction in a wired manner. For example, the another interface 1804 may be a fiber link interface, an ethernet interface, a copper wire interface, or the like. For example, the network device 1800 may further include a memory 1805, and the memory 1805 stores a computer program and an instruction. The memory 1805 may be coupled to the processor 1801 and/or the transceiver 1802, and is configured to support the processor 1801 in invoking the computer program and the instruction in the memory 1805 to implement the steps related to the network device 1800 in the methods provided in the embodiments of this application. In addition, the memory 1805 may be further configured to store data in the method embodiments of this application. For example, the memory 1805 is configured to store data and an instruction that are necessary for supporting the transceiver 1802 in implementing interaction.

An embodiment of this application further provides a communications apparatus, and the communications apparatus may be a terminal device or a circuit. The communications apparatus may be configured to perform an action performed by the terminal device in the foregoing method embodiments.

Figure 19:
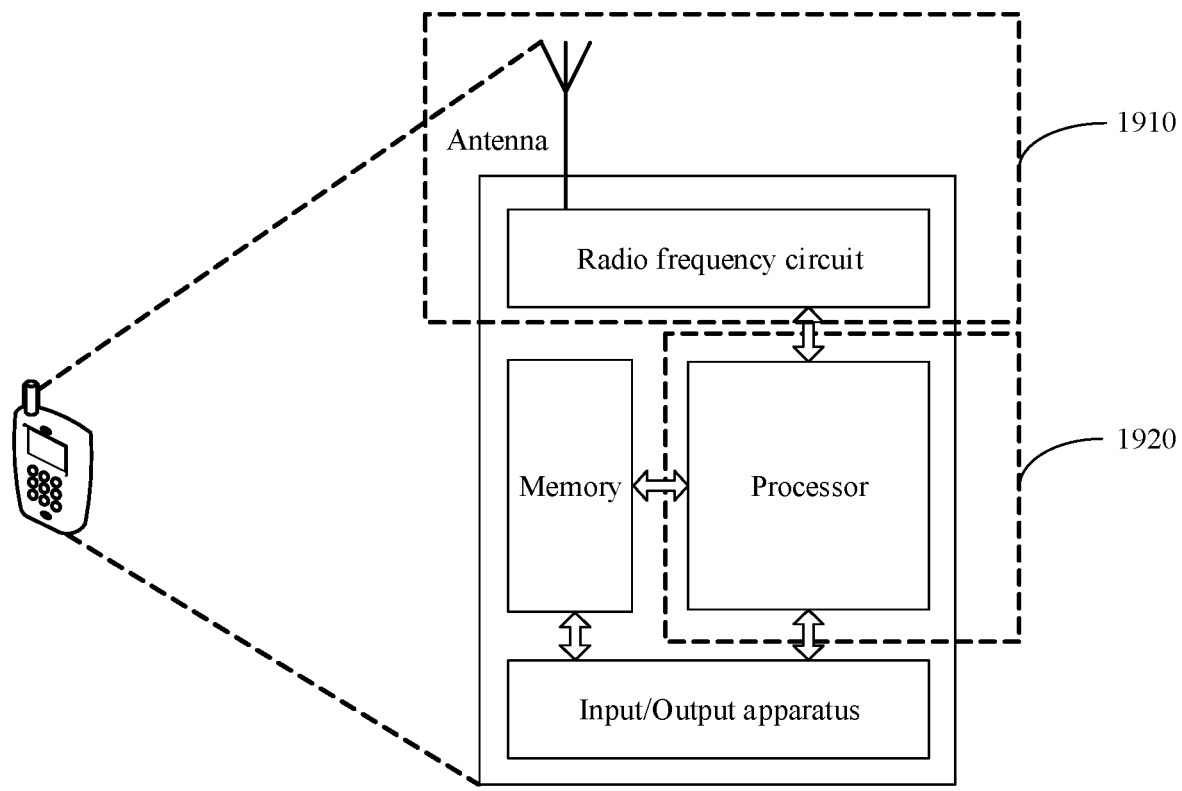
FIG. 19 is a schematic structural diagram of still another terminal device according to an embodiment of this application.

When the communications apparatus is a terminal device, FIG. 19 is a simplified schematic structural diagram of the terminal device. For ease of understanding and convenience of figure illustration, an example in which the terminal device is a mobile phone is used in FIG. 19. As shown in FIG. 19, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 19. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal device, and the processor that has a processing function may be considered as a processing unit of the terminal device. As shown in FIG. 19, the terminal device includes a transceiver unit 1910 and a processing unit 1920. The transceiver unit may also be referred to as a transceiver, a transceiver machine, a transceiver apparatus, or the like. The processing unit may also be referred to as a processor, a processing board, a processing module, a processing apparatus, or the like. Optionally, a component for implementing a receiving function in the transceiver unit 1910 may be considered as a receiving unit, and a component for implementing a sending function in the transceiver unit 1910 may be considered as a sending unit. In other words, the transceiver unit 1910 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1910 is configured to perform a sending operation and a receiving operation on the terminal device side in the foregoing method embodiments, and the processing unit 1920 is configured to perform an operation other than the receiving operation and the sending operation of the terminal device in the foregoing method embodiments.

For example, in an implementation, the transceiver unit 1910 is configured to perform a receiving operation on the terminal device in S101 in FIG. 3, and/or the transceiver unit 1910 is further configured to perform another sending and receiving step on the terminal device in the embodiments of this application. The processing unit 1920 is configured to perform S102 or S103 in FIG. 3. The processing unit 1920 is further configured to perform another processing step on the terminal device in the embodiments of this application.

For another example, in another implementation, the transceiver unit 1910 is configured to perform a receiving operation on the terminal device side in S201 in FIG. 5, and/or the transceiver unit 1910 is further configured to perform another sending and receiving step on the terminal device side in the embodiments of this application. The processing unit 1920 is configured to perform S202 or S203 in FIG. 4, and/or the processing unit 1920 is further configured to perform another processing step on the terminal device side in the embodiments of this application.

For still another example, in still another implementation, the transceiver unit 1910 is configured to perform a receiving operation on the terminal device side in S301 in FIG. 8, and/or the transceiver unit 1910 is further configured to perform another sending and receiving step on the terminal device side in the embodiments of this application. The processing unit 1920 is configured to perform S302 or S303 in FIG. 8, and/or the processing unit 1920 is further configured to perform another processing step on the terminal device side in the embodiments of this application.

For still another example, in still another implementation, the transceiver unit 1910 is configured to perform a receiving operation on the terminal device in S401 in FIG. 10, and/or the transceiver unit 1910 is further configured to perform another sending and receiving step on the terminal device side in the embodiments of this application. The processing unit 1920 is configured to perform S402 in FIG. 10, and/or the processing unit 1920 is further configured to perform another processing step on the terminal device side in the embodiments of this application.

For still another example, in still another implementation, the transceiver unit 1910 is configured to perform a receiving operation on the terminal device side in S501 in FIG. 12, and/or the transceiver unit 1910 is further configured to perform another sending and receiving step on the terminal device side in the embodiments of this application. The processing unit 1920 is configured to perform S502 in FIG. 12, and/or the processing unit 1920 is further configured to perform another processing step on the terminal device side in the embodiments of this application.

For still another example, in still another implementation, the transceiver unit 1910 is configured to perform a receiving operation on the terminal device side in S601 in FIG. 14, and/or the transceiver unit 1910 is further configured to perform another sending and receiving step on the terminal device side in the embodiments of this application. The processing unit 1920 is configured to perform S602 in FIG. 14, and/or the processing unit 1920 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 20:
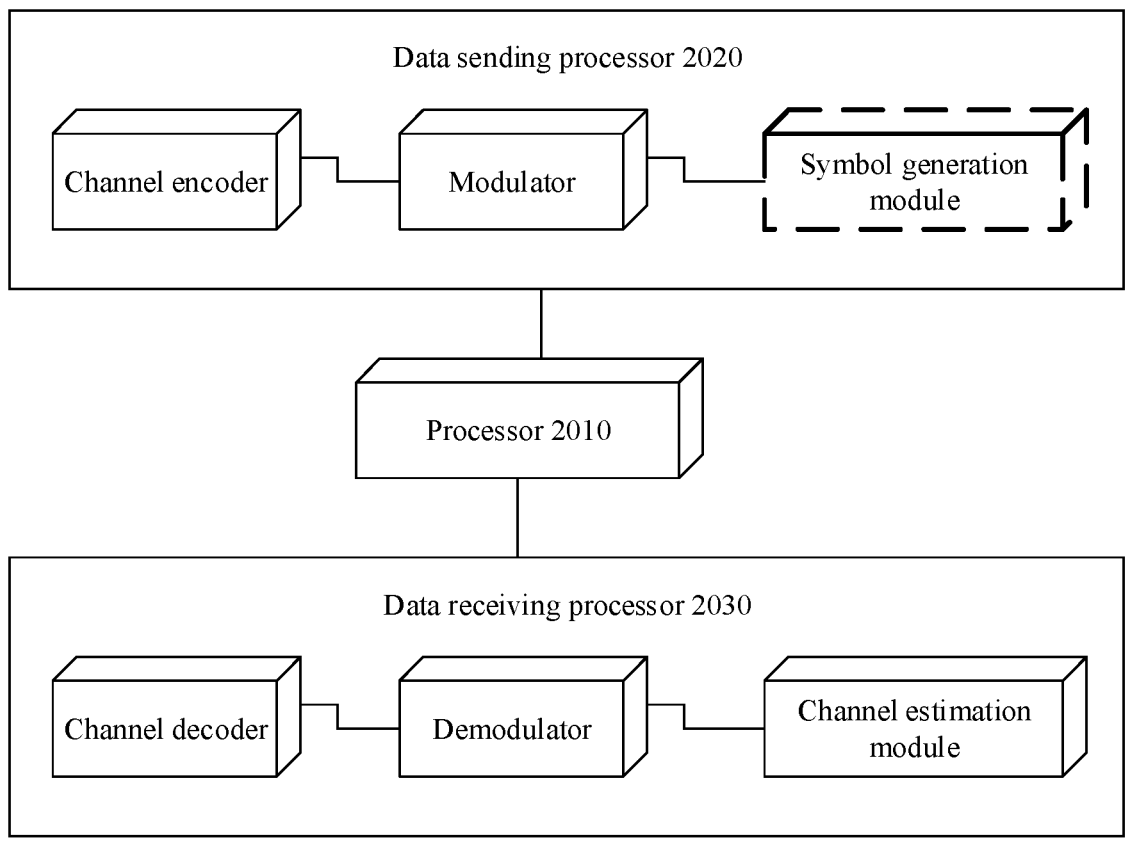
FIG. 20 is a schematic structural diagram of still another terminal device according to an embodiment of this application.

When the communications apparatus in this embodiment is a terminal device, refer to a device shown in FIG. 20. In an example, the device can implement the functions similar to those of the processor 1601 in FIG. 16. In FIG. 20, the device includes a processor 2010, a data sending processor 2020, and a data receiving processor 2030. The processing module 1501 in the foregoing embodiment may be the processor 2010 in FIG. 20, and completes corresponding functions. The transceiver module 1502 in the foregoing embodiment may be the data sending processor 2020 and/or the data receiving processor 2030 in FIG. 20. Although FIG. 20 shows a channel encoder and a channel decoder, it may be understood that these modules are merely examples, and do not constitute limitative descriptions of this embodiment.

Figure 21:
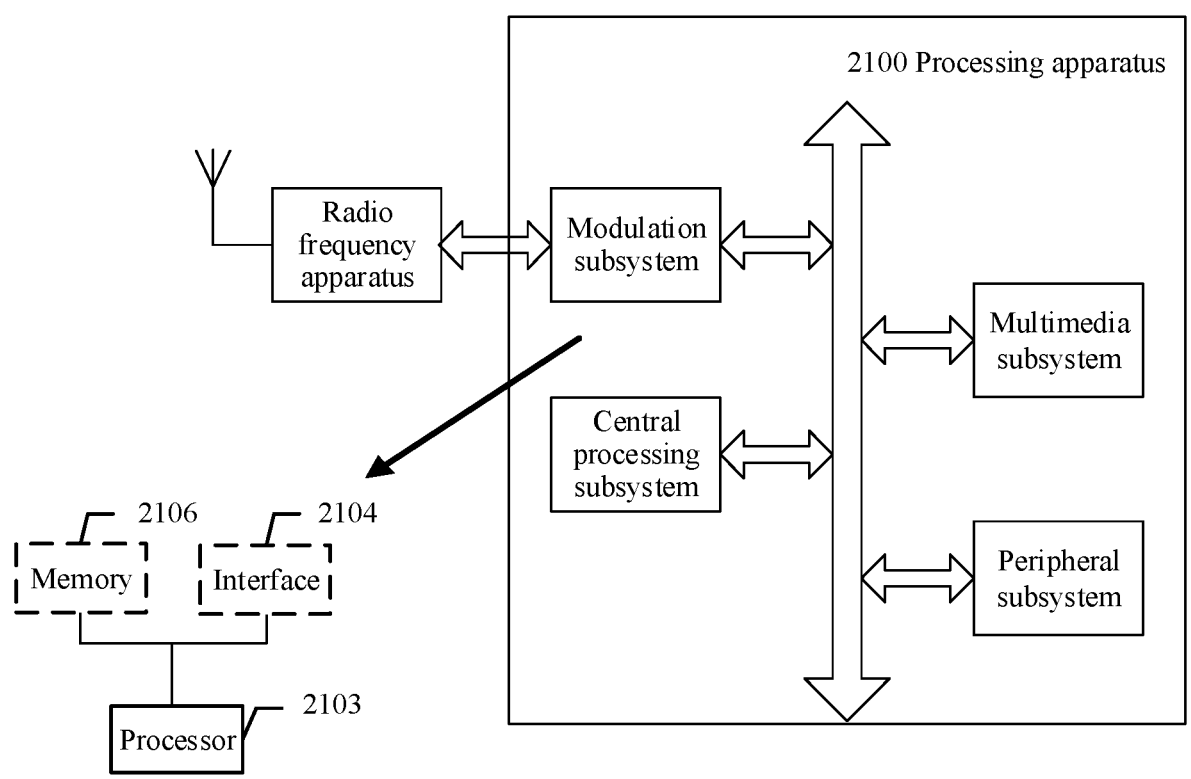
FIG. 21 is a schematic structural diagram of still another terminal device according to an embodiment of this application.

FIG. 21 shows another form of this embodiment. A processing apparatus 2100 includes modules such as a modulation subsystem, a central processing subsystem, and a peripheral subsystem. The communications apparatus in this embodiment may be used as the modulation subsystem in the processing apparatus 2100. Specifically, the modulation subsystem may include a processor 2103 and an interface 2104. The processor 2103 implements the functions of the processing module 1501, and the interface 2104 implements the functions of the transceiver module 1502. In another variation, the modulation subsystem includes a memory 2106, the processor 2103, and a program that is stored in the memory 2106 and that can be run on the processor. When executing the program, the processor 2103 implements the method on the terminal device side in the foregoing method embodiments. It should be noted that the memory 2106 may be nonvolatile or volatile. The memory 2106 may be located in the modulation subsystem, or may be located in the processing apparatus 2100, provided that the memory 2106 can be connected to the processor 2103.

In another form of this embodiment, a computer-readable storage medium is provided. The computer-readable storage medium stores an instruction. When the instruction is executed, the methods on the terminal device side in the foregoing method embodiments are performed.

In another form of this embodiment, a computer program product that includes an instruction is provided. When the instruction is executed, the methods on the terminal device side in the foregoing method embodiments are performed.

It should be understood that, the processor mentioned in the embodiments of the present invention may be a central processing unit (CPU), or the processor may be another general-purpose processor, a digital signal processor (DSP), an application-specific integrated circuit (ASIC), a field programmable gate array (FPGA) or another programmable logical device, a discrete gate, or a transistor logical device, a discrete hardware component, or the like. The general-purpose processor may be a microprocessor, or the processor may be any conventional processor or the like.

It should further be understood that the memory in the embodiments of the present invention may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be further understood that "first", "second", "third", "fourth", and various numbers in this specification are merely used for differentiation for ease of description, and are not construed as a limitation to the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing specific functions in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements specific functions in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing specific functions in one or more processes in the flowcharts and/or in one or more blocks in the block diagrams.

Although some possible embodiments of this application are described, a person skilled in the art can make changes and modifications to the embodiments once the basic inventive concept is learned. Therefore, the following claims are intended to be construed to cover the embodiments of this application and all changes and modifications falling within the scope of this application.

It is clear that a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A communication method comprising:
receiving, by a terminal device, a first command sent by a network device, wherein the first command carries a first identifier, the first command is used to activate a first bandwidth part (BWP) indicated by the first identifier, and the first BWP is a BWP on a first component carrier (CC);
ignoring, by the terminal device, the first command in response to the terminal device not supporting the first BWP and a second BWP being in an active state at the same time, wherein the second BWP is a BWP in the active state on a second CC, and the second CC is different from the first CC; and
after ignoring the first command, sending, by the terminal device, a first indication to the network device, wherein the first indication indicates that the first command does not take effect, and wherein the first indication carries the first identifier,
wherein the first indication is radio resource control (RRC) signaling or a medium access control (MAC) control element (CE).

2. The method according to claim 1, wherein there are a plurality of first commands, and each first command corresponds to one first CC;
wherein the terminal device not supporting the first BWP and the second BWP being in the active state at the same time comprises:
the terminal device does not support a plurality of first BWPs and a plurality of second BWPs being in the active state at the same time, wherein the plurality of first BWPs are first BWPs that are indicated by the first identifier, and each of the first BWPs is respectively carried in each of the plurality of first commands; and
wherein the ignoring the first command comprises:
ignoring, by the terminal device, the plurality of first BWPs.

3. The method according to claim 2, wherein there are the plurality of second BWPs and a plurality of second CCs; and
wherein the terminal device not supporting the first BWP and the second BWP being in the active state at the same time comprises:
the terminal device does not support the plurality of first BWPs and the plurality of second BWPs being in the active state at the same time.

4. The method according to claim 1, wherein the first command comprises a BWP activation command, a BWP switching command, or a secondary cell activation command.

5. The method according to claim 1, wherein the first command carries a second identifier, and the second identifier identifies the first CC.

6. The method according to claim 1, wherein the terminal device determines that the first BWP and the second BWP are not supported in an active state at the same time based on a capability of the terminal device.

7. The method according to claim 6, wherein the capability of the terminal device supports that only BWPs with a same parameter are supported in an active state in the same time.

8. The method according to claim 7, wherein the parameter comprises one or more of a subcarrier spacing (SCS) and a cyclic prefix.

9. A communication method comprising:
sending, by a network device, a first command to a terminal device, wherein the first command carries a first identifier, the first command is used to activate a first bandwidth part (BWP) indicated by the first identifier, and the first BWP is a BWP on a first component carrier (CC); and
receiving, by the network device a first indication sent by the terminal device, wherein the first indication indicates that the first command does not take effect, and wherein the first indication carries the first identifier,
wherein the first indication is radio resource control (RRC) signaling or a medium access control (MAC) control element (CE).

10. The method according to claim 9, wherein there are a plurality of first commands, and each first command corresponds to one first CC.

11. The method according to claim 9, wherein the first command comprises a BWP activation command, a BWP switching command, or a secondary cell activation command.

12. The method according to claim 8, wherein the first command carries a second identifier, and the second identifier identifies the first CC.

13. A terminal device comprising:
a transceiver, configured to cooperate with a processor to receive a first command sent by a network device, wherein the first command carries a first identifier, the first command is used to activate a first bandwidth part (BWP) indicated by the first identifier, and the first BWP is a BWP on a first component carrier (CC);
the processor, configured to ignore the first command when determining that the processor does not support the first BWP and a second BWP being in an active state at the same time, wherein the second BWP is a BWP in the active state on a second CC, and the second CC is different from the first CC; and
the transceiver further configured to cooperate with the processor to send a first indication to the network device, wherein the first indication indicates that the first command does not take effect, and wherein the first indication carries the first identifier,
wherein the first indication is radio resource control (RRC) signaling or a medium access control (MAC) control element (CE).

14. The terminal device according to claim 13, wherein there are a plurality of first commands, and each first command corresponds to one first CC;
wherein that the processor determines that the processor does not support the first BWP and the second BWP being in the active state at the same time comprises:
the processor is configured to determine that the processor does not support a plurality of first BWPs and a plurality of second BWPs being in the active state at the same time, wherein the plurality of first BWPs are first BWPs that are indicated by the first identifier, and each of the first BWPs is respectively carried in each of the plurality of first commands; and wherein that the processor ignores the first command comprises:
  the processor is configured to ignore the plurality of first BWPs.

15. The terminal device according to claim 14, wherein there are the plurality of second BWPs and a plurality of second CCs; and
  wherein that the processor determines that the processor does not support the first BWP and the second BWP being in the active state at the same time comprises:
    the processor is configured to determine that the processor does not support the plurality of first BWPs and the plurality of second BWPs being in the active state at the same time.

16. The terminal device according to claim 13, wherein the first command comprises a BWP activation command, a BWP switching command, or a secondary cell activation command.

17. The terminal device according to claim 13, wherein the first command carries a second identifier, and the second identifier identifies the first CC.

18. The terminal device according to claim 13, wherein the processor determines that the first BWP and the second BWP are not supported in an active state at the same time based on a capability of the terminal device.

19. The terminal device according to claim 18, wherein the capability of the terminal device supports that only BWPs with a same parameter are supported in an active state in the same time.

20. The terminal device according to claim 19, wherein the parameter comprises one or more of a subcarrier spacing (SCS) and a cyclic prefix.

* * * * *